US012785760B2

(12) United States Patent
Khaira et al.

(10) Patent No.: US 12,785,760 B2
(45) Date of Patent: Nov. 3, 2026

(54) SYSTEM AND METHOD FOR A SELF-POWERING METASURFACE UNIT CELL ARRAY FOR LOCATION TRACKING OF ASSETS

(71) Applicant: Dell Products LP, Round Rock, TX (US)

(72) Inventors: Navjot Kaur Khaira, Manotick (CA); Tejinder Singh, Manotick (CA); Harpreet S. Narula, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/190,717

(22) Filed: Apr. 27, 2025

(65) Prior Publication Data

US 2026/0342385 A1 Oct. 29, 2026

(51) Int. Cl.
*H04B 7/02* (2018.01)
*H02J 7/50* (2026.01)
(Continued)

(52) U.S. Cl.
CPC ............ *H04B 7/04013* (2023.05); *H02J 7/50* (2026.01); *H02J 50/001* (2020.01); *H02J 50/20* (2016.02)

(58) Field of Classification Search
CPC .... H04B 7/04013; H02J 50/20; H02J 50/001; H02J 7/50
(Continued)

(56) References Cited

U.S. PATENT DOCUMENTS 10,135,123 B1 11/2018 Arnitz
10,468,776 B2 11/2019 Urzhumov
(Continued)

FOREIGN PATENT DOCUMENTS

EP 4175068 A1 5/2023
EP 4020711 B1 10/2024
(Continued)

OTHER PUBLICATIONS

Seyyed Amir Ayati, et al., "Adaptive Integrated CMOS Circulator", 2016 IEEE Radio Frequency Integrated Circuits Symposium, May 2016, 4 pages.
(Continued)

*Primary Examiner* — Zewdu A Kassa
(74) *Attorney, Agent, or Firm* — Prol Intellectual Property Law, PLLC; H. Kenneth Prol

(57) ABSTRACT

A system and method of self-powering a metasurface unit cell array operatively coupled to the information handling system to harvest power from an incident radiofrequency (RF) signal, the metasurface unit cell array including a plurality of metasurface unit cells, each of the plurality of metasurface unit cells including: a reflective element to reflect a portion of the RF signal incident to the surface of the metasurface unit cell array, and a substrate-integrated waveguide (SIW) to harvest power from a second portion of the RF signal via a rectifier circuit to convert the captured RF signals into direct current (DC) voltage output. A metasurface PMU to selectively charge a first battery and discharge a second battery of the metasurface unit cell array to power the metasurface unit cell array or generate transmissions of a tracking location data RF signal towards a receiving device to track the information handling system.

20 Claims, 9 Drawing Sheets

(51) Int. Cl.

| | |
|---|---|
| ***H02J 50/00*** | (2016.01) |
| ***H02J 50/20*** | (2016.01) |
| ***H04B 7/04*** | (2017.01) |

(58) Field of Classification Search

USPC ................ 375/267, 260, 259, 219, 295, 316

See application file for complete search history.

(56) References Cited

U.S. PATENT DOCUMENTS

| | | | |
|---|---|---|---|
| 12,192,043 | B2 | 1/2025 | Hemadeh |
| 2011/0300891 | A1 | 12/2011 | Deb |
| 2012/0218799 | A1 | 8/2012 | Furukawa |
| 2018/0323657 | A1 | 11/2018 | Hannigan |
| 2019/0044246 | A1 | 2/2019 | Pitsillides |
| 2019/0148985 | A1 * | 5/2019 | Barukh .................. H01Q 19/30 307/104 |
| 2019/0333623 | A1 | 10/2019 | Hibbard |
| 2020/0025619 | A1 | 1/2020 | Almasri |
| 2020/0227632 | A1 | 7/2020 | Kim |
| 2021/0028547 | A1 | 1/2021 | Falk |
| 2021/0048693 | A1 | 2/2021 | Falk |
| 2021/0050515 | A1 | 2/2021 | Falk |
| 2021/0336345 | A1 | 10/2021 | Falk |
| 2023/0027067 | A1 | 1/2023 | Liu |
| 2023/0047663 | A1 | 2/2023 | Wang |
| 2023/0094688 | A1 | 3/2023 | Lai |
| 2023/0143991 | A1 | 5/2023 | Takeshima |
| 2023/0188170 | A1 | 6/2023 | Dutta |
| 2023/0239723 | A1 | 7/2023 | Gurelli |
| 2023/0254031 | A1 | 8/2023 | Gurelli |
| 2023/0408677 | A1 | 12/2023 | Duan |
| 2024/0049189 | A1 | 2/2024 | Gao |
| 2024/0097744 | A1 | 3/2024 | Bhamri |
| 2024/0337722 | A1 | 10/2024 | Shrivastava |
| 2024/0413858 | A1 | 12/2024 | Mcmenamy |

FOREIGN PATENT DOCUMENTS

| | | | |
|---|---|---|---|
| JP | 7307825 | B2 | 7/2023 |
| WO | 2019/212804 | A1 | 11/2019 |
| WO | 2020/136026 | A1 | 7/2020 |
| WO | 2023/152856 | A1 | 8/2023 |
| WO | 2023/184079 | A1 | 10/2023 |
| WO | 2023/220319 | A1 | 11/2023 |
| WO | 2024/171093 | A1 | 8/2024 |
| WO | 2024/182953 | A1 | 9/2024 |

OTHER PUBLICATIONS

Mustafa Mert Torunbalci, et al., "An FBAR Circulator", IEEE Microwave and Wireless Components Letters, vol. 28, No. 5, May 2018, 3 pages.

C. E. Fay, et al., "Operation of the Furrite Junction Circulator", IEEE Transactions on Microwave Theory and Techniques, Jan. 1965, 13 pages.

* cited by examiner

SYSTEM AND METHOD FOR A SELF-POWERING METASURFACE UNIT CELL ARRAY FOR LOCATION TRACKING OF ASSETS

FIELD OF THE DISCLOSURE

The present disclosure generally relates to a metasurface unit cell array and use of a metasurface unit cell array to capture radiofrequency energy from incoming radiofrequency signals. The present disclosure more specifically relates systems and methods for harvesting power from incoming radiofrequency energy with a metasurface unit cell array for self-powering a system for tracking assets during shipment or transportation.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used for wireless communications including transmission and reception of radiofrequency data signals via wireless radio systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
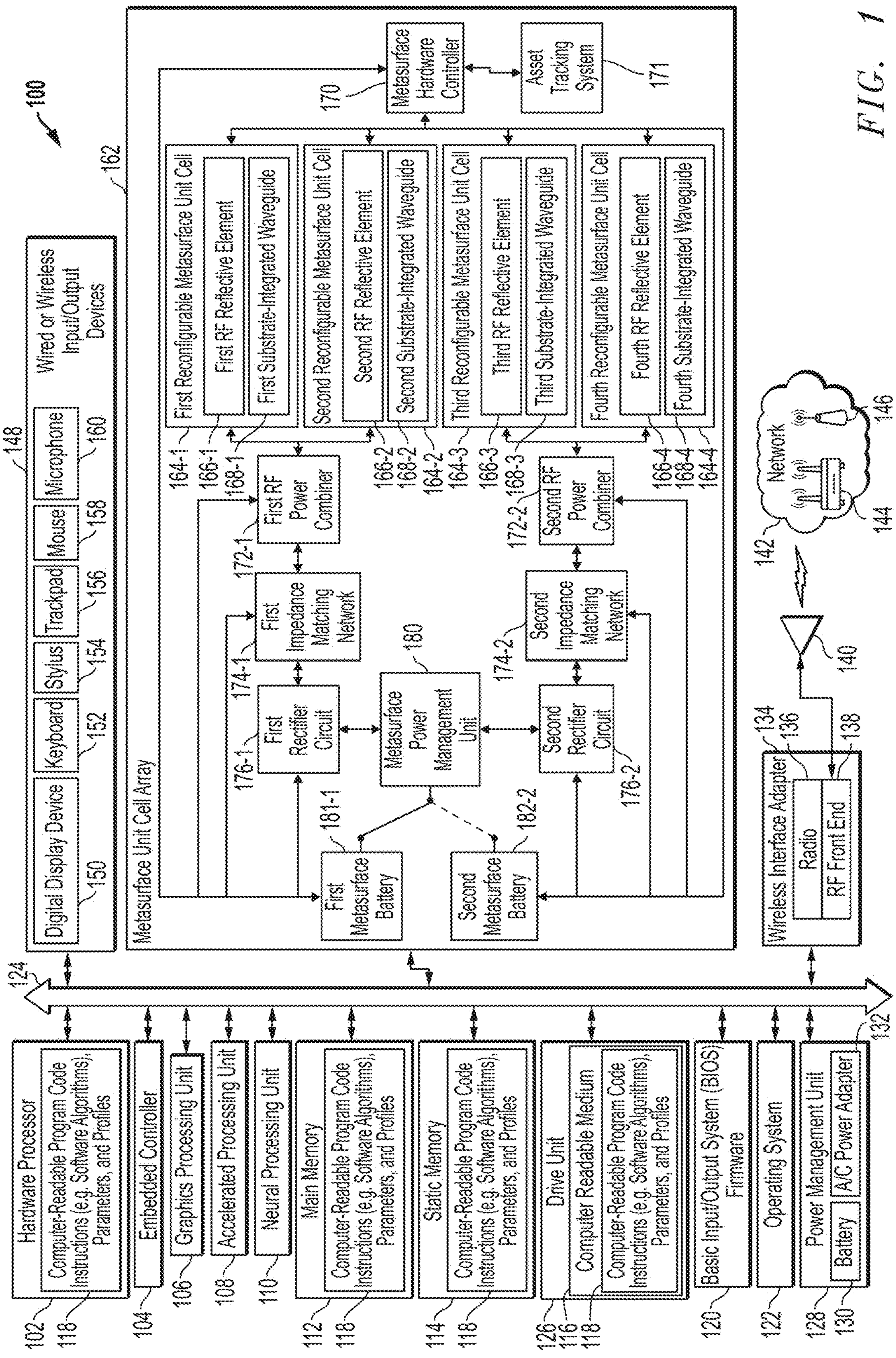
FIG. 1 is a block diagram illustrating an information handling system interfacing with a metasurface unit cell array comprising a plurality of metasurface unit cells that each include a substrate-integrated waveguide for power harvesting from incident radiofrequency signals according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Wireless data transmission from a transmitting device to a receiving device allows for rapid wireless data transmission and communication between multiple devices. Devices may include wirelessly enabled information handling systems, access point devices, or any computing device, such as internet of things (IOT) devices that are wirelessly capable. As data transmission requirements increase, various electromagnetic (EM) wave radiofrequencies (e.g., 5G technologies using 20 to 50 GHz wireless signals or WiFi 6 signals at 2.4 GHz, 5 GHz or even 6 GHz) are used, including from non-terrestrial network (NTN) sources, to transmit these ever-increasing amounts of data and may benefit from extended range such as to reach around radiofrequency barriers such as walls.

Additionally, in the logistics industry, tracking the location of high-value assets such as information handling systems (e.g., laptops) and other hardware assets during shipment is used for ensuring security, preventing theft, and providing accurate delivery updates. However, a significant challenge arises when these hardware assets are shipped with completely drained batteries, rendering them unable to communicate their location or status, even when NTN networks or the like are available. This results in a gap in tracking capability, potentially leading to lost or stolen hardware assets and a lack of real-time information as to each hardware asset's location. A solution is needed that integrates a self-powering metasurface unit cell array capable of harvesting radio frequency (RF) energy from the surrounding RF environment. The metasurface unit cell array of embodiments herein may capture ambient RF non-terrestrial network (NTN) signals from satellites, for example, or RF signals from other nearby communication devices The metasurface unit cell array of embodiments herein may then convert those captured NTN RF signals and other RF signals into usable power via one or more rectifier circuits for charging a single battery or alternating plural battery system to sustain operation of an asset tracking system within the metasurface unit cell array and/or hardware asset.

The metasurface unit cell arrays of embodiments of the present disclosure may be used at any point of movement and location of the hardware asset, such as computer information handling systems, during shipment, storage, or delivery of the hardware asset from the manufacturer to end destination locations. Thus, these hardware assets may be associated with a metasurface unit cell array by either coupling the metasurface unit cell array to the hardware asset or incorporating the metasurface unit cell array into a packaging or containers of the hardware asset for shipping.

The metasurface unit cell array may include a plurality of metasurface unit cells. Each of the plurality of metasurface unit cells may include a reflective element resonant structure to reflect a first portion of the electromagnetic (EM) waves of environmental radiofrequency signals incident to the surface of the metasurface unit cell array and a substrate-integrated waveguide (SIW) with EM coupling probe to harvest power from a second portion of the EM waves via EM coupling probe with a power interconnect within the SIW carrying the EM wave energy from the surface resonant structures. Each of the plurality of metasurface unit cells includes a EM coupler signal readout pad operatively coupled to one or more rectifier circuits that converts the EM waves into direct current (DC) voltage in embodiments herein. In an embodiment, a metasurface PMU may selectively charge a first battery of the metasurface unit cell array and discharge a second battery of the metasurface unit cell array to power an asset tracking system using transmissions of an RF signal towards a receiving device to provide location tracking of the hardware asset.

In an embodiment, the reflective element of each of the plurality of metasurface unit cells may be powered by the PMU from the second battery to, via phase shifting using a tunable varactor controlled via the power interconnect, beamform the reflected EM waves towards the receiving device to either reflect incoming RF signals or assist in transmission of an RF signal for asset tracking. In an embodiment, the metasurface unit cell array may include a first subgroup of the plurality of metasurface unit cells comprising the SIWs to harvest power from the EM waves via the one or more rectifier circuits to charge the first battery. The metasurface unit cell array may include a second subgroup of the plurality of metasurface unit cells comprising metasurface unit cells to, via a tunable phase shifting element such as the tunable varactor in some embodiments herein, beamform the reflected EM waves towards the receiving device.

In an embodiment, the rectifier circuit within each of the metasurface unit cells may include a Dickson voltage rectifier that includes sets of diodes and capacitors that each define a stage and wherein the number of stages formed within the Dickson voltage rectifier is selected based on the level of EM signal being received and the level of DC voltage desired to be harvested from the plurality of metasurface unit cells. In an embodiment, plural rectifier circuits may include a plurality of Dickson voltage rectifiers that each include a different number of stages of diodes and capacitors selected for optimized power harvesting depending on the EM power levels of the captured RF signals. The Dickson voltage rectifiers of the plural rectifier circuits are operatively coupled to an RF circulator switch to dynamically switch between the plurality of Dickson voltage rectifiers based on the received EM power level from the captured RF signal and detected to switch the RF circulator between the two rectifier circuits. In this embodiment, the Dickson voltage rectifier may include a first Dickson voltage rectifier comprising ten stages and a second Dickson voltage rectifier comprising 7 stages. The larger number of stages may provide a higher harvested DC voltage output but may not be effective when the captured EM power levels of the RF signal are low, such as below an EM power level threshold. In the case of lower EM power level below a threshold, the RF circulator is switched off to routes the captured RF signals to the rectifier circuit with fewer stages by default to still allow capture of EM energy although with a lower harvested DC voltage output.

In an embodiment, the metasurface unit cell array may further include an RF power combiner circuit to combine each harvested power output voltage from each of the plurality of metasurface unit cells into a single output. In an embodiment, an impedance matching network circuit to optimize power transfer from the RF power combiner to the rectifier circuit are used to minimize power loss in the transfer from the EM coupler readout pads and RF power combiner circuit to the rectifier circuits.

Thus, the presently-described metasurface unit cell array of embodiments herein may allow for real-time tracking of hardware assets during shipment, reducing instances of lost or stolen hardware assets with EM energy harvesting from RF signals with a metasurface unit cell array. In embodiments of the present disclosure, a plurality of self-powering metasurface unit cells as described herein can harvest power to ensure continuous tracking of high-value cargo, such as electronics or pharmaceuticals, by harvesting EM energy from satellite RF signals or other RF signals within the RF environment and maintain the location data transmission with an asset tracking system throughout the journey despite a drained battery of the hardware asset. In an embodiment, the asset tracking location data may be transmitted back to an access point, base station, satellite, or another receiving device in order to relay current location data of the hardware assets and other shipped goods. It is appreciated that this system and method may be extended to other hardware devices such as scientific equipment and server supplies sent to or through distant or remote locations. These remote locations may include trans-oceanic journeys or to research stations in the Arctic or Antarctic with these particular hardware assets often facing harsh conditions with limited power sources. The self-sufficient tracking system within the metasurface unit cell array may ensure the safety and location of these hardware assets, even in these extreme environments.

Turning now to the figures, FIG. 1 illustrates an information handling system 100 similar to the information handling systems according to several aspects of the present disclosure that may operate as a source or target radiofrequency device for use with the metasurface unit cell arrays of the embodiments of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system within a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Machine-readable code instructions stored in main memory 112 (e.g., RAM) may be accessible by hardware processing resources using that main memory 112. Machine-readable program code instructions stored in static memory 114, main memory 112, or drive unit 126 may be involved in invoking such machine-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a digital display device 150, a microphone 160, or any combination thereof. Portions of an information handling system 100 may themselves be considered information handling systems 100.

Information handling system 100 may include devices or modules that embody one or more of the devices or execute instructions for one or more systems and modules. The information handling system 100 may execute machine-readable program code instructions (e.g., software algorithms) parameters, and profiles 118 that may operate on servers or systems, remote data centers, or on-box in individual client information handling systems according to various embodiments herein. In some embodiments, it is understood any or all portions of machine-readable program code instructions (e.g., software algorithms) parameters, and profiles 118 may operate on a plurality of information handling systems 100.

The information handling system 100 may include the hardware processor 102 such as a central processing unit (CPU) or other hardware processing resource (e.g., 104, 106, 108, 110). Any of the hardware processing resources may operate to execute machine-readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with machine-readable medium 116 storing machine-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, digital display device 150, stylus 154, trackpad 156, microphone 160, among other peripheral devices.

As described herein, the information handling system 100 further includes a digital display device 150. The digital display device 150 in an embodiment may function as a liquid crystal display (LCD), an organic light emitting diode (OLED), a flat panel display, or a solid-state display. It is appreciated that the digital display device 150 may be wired or wireless and may be an external digital display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the digital display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein. The present specification contemplates that the wired or wireless I/O devices 148 may be wired or wireless.

A network interface device of the information handling system 100 may be wired or wireless such as shown with wireless interface adapter 134 that can provide wireless connectivity among plural devices such as with Bluetooth® or to a network 142 such as with a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, the wireless interface device 134 with its radio 136, RF front end 138 and antenna 140 is used to communicate with a WWAN or and WLAN which may each include an AP 144 or base station 146 used to operatively couple the information handling system 100 to a network 142 via the wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols. It is appreciated that the information handling system 100 may wirelessly communicate with a target receiver device via enhanced radiofrequency propagation with reflection using the metasurface unit cell array 162. In other embodiments, the metasurface unit cell array 162 may operate to reflect EM waves of radiofrequency signals between other receiver devices such as a satellite receiver or an AP 144 or base station 146 within a RF environment in embodiments herein. For example, the receiver device may be any other device and may include the AP 144, the base station 146, an NTN facilitated by a satellite, or any other computing device described herein. Additionally, the information handling system 100 and receiver device may be capable of transmitting wireless data using, for example, radiofrequency signals in EM waves that include 5G mm wave lengths including FR1 and FR2 such as those included within sub-6 GHz range and the 20-50 GHz range or WiFi wavelengths such as 2.4 GHz, 5 GHZ, 6 GHz or others to be used with later versions of WiFi. Thus, in an embodiment, the metasurface unit cell array 162 is capable of relaying these types of mm waves. In an embodiment, the metasurface unit cell array 162 may be operatively coupled to a surface on the information handling system 100. In another embodiment, the metasurface unit cell array 162 may be a standalone device operatively coupled to a surface within a radiofrequency environment, such as packaging or containers, with power being self-provided at the metasurface unit cell array 162.

In an embodiment, the wireless interface adapter 134 may operate in accordance with any wireless data communication standards. To communicate with a wireless local area network and/or the receiver device 178, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes machine-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit (ASIC). Accordingly, the present system encompasses a hardware processing resource executing machine-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a machine-readable medium that includes machine-readable program code instructions, parameters, and profiles 118 or receives and executes machine-readable program code instructions, parameters, and profiles 118 responsive to a propagated signal, so that a hardware device connected to a network 142 may communicate voice, video, or data over the network 142. Further, the machine-readable program code instructions, parameters, and profiles 118 may be transmitted or received over the network 142 via the network interface device or wireless interface adapter 134.

The information handling system 100 or a metasurface unit cell array 162 may include a set of machine-readable program code instructions, parameters, and profiles 118 that may be executed to cause the computer system to perform any one or more of the methods or computer-based functions disclosed herein. In one example embodiment, a metasurface hardware controller 170 of the metasurface unit cell array 162 may execute machine readable code instructions of an asset tracking system 171 to send asset tracking RF signals to track a hardware asset as self-powered according to embodiments herein. In other examples, machine-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application machine-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a machine-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain machine-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain machine-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the machine-readable medium is shown to be a single medium, the term "machine-readable medium" includes a single medium or multiple media, such as a centralized or distributed database, and/or associated caches and servers that store one or more sets of machine-readable code instructions. The term "machine-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, the video/graphic display device 150, or other wired or wireless I/O devices 148 such as the mouse 158, the stylus 154, the keyboard 152, and the trackpad 156 and other components that may require power when a power button has been actuated by a user. In an embodiment, the PMU 128 may monitor power levels and be electrically coupled to the information handling system 100 in embodiments herein to provide this power. The PMU 128 may be coupled to the bus 124 to provide or receive data or machine-readable code instructions. The PMU 128 may regulate power from a power source such as the battery 130, or AC power adapter 132. In an embodiment, the battery 130 may be charged via the AC power adapter 132 and provide power to the components of the information handling system 100, via wired connections, or when AC power from the AC power adapter 132 is removed.

In a particular non-limiting, exemplary embodiment, the machine-readable medium can include a solid-state memory such as a memory card or other package that houses one or more non-volatile read-only memories. Further, the machine-readable medium can be a random-access memory or other volatile re-writable memory. Additionally, the machine-readable medium can include a magneto-optical or optical medium, such as a disk or tapes or other storage device to store information received via carrier wave signals such as a signal communicated over a transmission medium. Furthermore, a machine-readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a machine-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively coupled to the metasurface unit cell array 162 in embodiments herein. This operative coupling may include a wired coupling that allows the metasurface unit cell array 162 to provide power to, at least, the wireless interface adapter 134 of the information handling system 100 in some embodiments. This allows the metasurface unit cell array 162 to provide power to the information handling system 100 in order to facilitate the wireless transmission of location data RF signals that describes the location of the information handling system 100 (or other hardware asset). Transmission of such location data RF signals may be made to a receiving device that may include an access point 144, a base station 146, or NTN satellite (not shown). This allows the information handling system 100 to report its location regardless of location using power harvested by the metasurface unit cell array 162 in embodiments herein. In an alternative embodiment, the metasurface unit cell array 162 may include an array of metasurface unit cells 164-1, 164-2, 164-3, 164-4 that may reflect RF transmissions, including providing the device location data RF signal, back to a source transmitting device in order to report the hardware assets' location in real-time. Thus, in this embodiment, power harvested at the metasurface unit cell array is provided to the metasurface unit cells 164-1, 164-2, 164-3, 164-4 to reconfigure each metasurface unit cell 164-1, 164-2, 164-3, 164-4 and beamform the reflected RF transmission back to the source transmitting device. This may include beamforming for a device location data RF signal for the hardware asset as well and transmitted by the wireless interface adapter 134 on the information handling system or a separate location signal radio (not shown) independently on the panel of the metasurface unit cell array 162 in another embodiment.

In order to provide this power to the information handling system 100, each of the metasurface unit cells 164-1, 164-2, 164-3, 164-4 may harvest a portion of EM energy of a received RF signal by capturing the RF signal with an EM coupling probe within a substrate-integrated waveguide (SIW) 168-1, 168-2, 168-3 or 168-4. The metasurface unit cells 164-1, 164-2, 164-3, 164-4 may then transmit and convert that EM energy of the captured RF signal into a DC voltage and charge at least one battery 182-1, 182-2 at the metasurface unit cell array 162. In an embodiment, each of the metasurface unit cells 164-1, 164-2, 164-3, 164-4 may include a substrate-integrated waveguide (SIW) 168-1, 168-2, 168-3, 168-4. The SIW 168-1, 168-2, 168-3, 168-4 may include in a shielded chamber a power interconnect which carries the RF signal from surface resonant structures such as RF reflective elements 166-1, 166-2, 166-3, or 166-4 and an EM coupling probe, such that a portion of the incoming EM energy from the RF signal transmissions of the transmitting hardware devices (e.g., satellites or other RF sources) is electromagnetically coupled to and captured by the EM coupling probe. This energy, harnessed from multiple metasurface unit cells 164-1, 164-2, 164-3, 164-4 in their respective SIWs 168-1, 168-2, 168-3, 168-4 are to be aggregated using a RF power combiner 172-1, 172-2 and then converted into a direct current (DC) signal using a rectifier circuit 176-1, 176-2.

In an embodiment, a metasurface power management unit (PMU) 180 may direct, which may work in connection with or as part of the metasurface hardware controller 170, which of a first metasurface battery 182-1 or a second metasurface battery 182-2 is to be charged from the harvested power from each of the metasurface unit cells 164-1, 164-2, 164-3, 164-4. Additionally, the metasurface PMU 280 may also control which of the first metasurface battery 182-1 or second metasurface battery 182-2 to discharge and, therefore, use to power the metasurface hardware controller 170 to execute machine readable code instructions of the asset tracking system 170 to generate or beamform location data RF transmissions back to the transmitting device in order to identify and relay the location of the hardware asset (e.g., information handling system 100) associated with the metasurface unit cell array 162. As described herein, this power may be discharged to power the wireless interface adapter 134 of the information handling system 100 or a separate location signal radio (not shown) onboard the metasurface unit cell array 162 so that wireless transmissions from the wireless interface adapter 134 (with the radio 136 and RF front end 138) or location signal radio may be transmitted to the source transmitting device. Further, the power may be discharged in order to reconfigure the metasurface unit cells 164-1, 164-2, 164-3, 164-4 as described herein for beamforming reflection of an incoming RF signal or a location data RF signal from the asset tracking system 171 for the hardware asset location. For example, power may be provided to a varactor (not shown) associated with each RF reflective element 166-1, 166-2, 166-3, 166-4 of each of the respective metasurface unit cells 164-1, 164-2, 164-3, 164-4. The RF reflective resonant element 166-1, 166-2, 166-3, 166-4 may include one or more resonant structures, formed conductors such as metal, on a dielectric substrate at an outer surface of each metasurface unit cell 164-1, 164-2, 164-3, 164-4 sized and spaced for resonance or incoming wavelengths of RF signals at the metasurface unit cell array. Each metasurface unit cell 164-1, 164-2, 164-3, 164-4 may be reconfigurable in that a varactor may send a tuning voltage in order to alter capacitance at the resonant structures at the RF reflective resonant element 166-1, 166-2, 166-3, 166-4. This tuning voltage to the varactor may adjust the phase of reflection of the incoming RF signal in order to, with the operation of the other metasurface unit cells 164-1, 164-2, 164-3, 164-4, create a phase profile across the surface of the metasurface unit cell array 162 and beamform a reflected RF signal or an added location data RF signal back to the transmitting device (e.g., a satellite) or to a receiving device. In an embodiment, the metasurface hardware controller 170 may receive this power and, via execution of the asset tracking system 171, control the operation of the varactors associated with each of the metasurface unit cells 164-1, 164-2, 164-3, 164-4. This allows the metasurface unit cell array 162 to operate as a stand-alone device that is associated with hardware assets to be tracked or in conjunction with the metasurface unit cell array 162 of the information handling system 100 in order to relay a return RF signal or a location data RF signal from the asset tracking system 170 to the source transmitting device or another receiver device. Although a varactor is described as used for a phase-shifting circuit of the resonant structures for the RF reflective resonant elements 166-1, 166-2, 166-3, 166-4, other tunable phase-shifting or phase-delay circuits are also contemplated for adjusting beamforming directionality of reflected RF signals at the metasurface unit cell array 162 in various embodiments herein.

The SIWs 168-1, 168-2, 168-3, 168-4 used across portions of the metasurface unit cells 164-1, 164-2, 164-3, 164-4 may be configured to harvest a predetermined portion of EM power from the originally received RF signal at the metasurface unit cell array 162. Further, plural rectifier circuits 176-1, 176-2 may selected depending on the EM energy levels or power of the received RF signals at the metasurface unit cell array 162 In an embodiment, the amount of EM energy power in the received RF signals may cause a switch between what type of rectifier circuit 176-1, 176-2 that may be used to convert the high frequency alternating current (AC) of the electromagnetic (EM) energy for RF signals received at the SIWs 168-1, 168-2, 168-3, 168-4 into the DC voltage. In an embodiment, the rectifier circuits 176-1, 176-2 may include a Dickson voltage rectifier that includes sets of diodes and capacitors that each define plural stages of the rectifier circuits 176-1, 176-2. In this embodiment, the number of stages formed within the Dickson voltage rectifier is selected based on EM energy power levels in the received RF signal as well as the DC voltage to be harvested from the plurality of metasurface unit cells. For example, for a relatively higher DC voltage, such as at 30 to 40 volts (V), to be harvested, the number of stages may be increased, such as to nine or ten in example embodiments. However, the larger number of stages of the Dickson rectifier or other rectifier for the rectifier circuits 176-1, 176-2 may not adequately receive and convert a captured RF signal having lower EM wave energy or power. Thus, where the captured RF signal having lower EM wave energy or power is received from the plurality of associated metasurface unit cells 164-1, 164-2, 164-3, 164-4 the number of stages may be reduced but the reduced number of stages yield lower power harvesting voltage. For example, in an embodiment, one stage is used for a rectifier circuit 176-1, 176-2 to convert captured RF signal having lower EM wave energy or power, the harvested power voltage may be as low as at 1 to 10 V. It is appreciated that, as the detected EM wave energy or power for the RF signals received by the plurality of metasurface unit cells 164-1, 164-2, 164-3, 164-4 is increased, the number of Dickson rectifier circuit stages may also increase for a selected rectifier circuits 176-1, 176-2 to enable harvesting of higher power voltages from the plurality of metasurface unit cells 164-1, 164-2, 164-3, 164-4 in embodiments herein. In one embodiment, only one type of rectifier circuit 176-1 is used to harvest power voltage from all metasurface unit cells 164-1, 164-2, 164-3, 164-4 as shown in the dashed line to rectifier circuit 167-1. The Dickson rectifier circuit stages each include sets of diodes and capacitors that each define a stage within the Dickson voltage rectifiers and modify the alternating current signals to rectify them to direct current or near direct current signals from which DC power voltage may be harvested and stored in metasurface batteries 182-1 or 182-1 as controlled by the metasurface PMU 180.

In other embodiments, each rectifier circuit 176-1, 176-2 may be a wide power range rectifier, each with plural Dickson voltage rectifiers having a different number of stages to accommodate varying level of EM energy power in the incoming captured RF signals at the metasurface unit cell array described further in embodiments below. A RF circulator switch (not shown) may be used to switch between the plural Dickson voltage rectifiers in each wide power range rectifier circuit 176-1, 176-2 having different numbers of stages. In this embodiment, one Dickson voltage rectifier of each wide power range rectifier circuit 176-1, 176-2 may have fewer Dickson voltage rectifier stages than the second Dickson voltage rectifier in each wide power range rectifier circuit 176-1, 176-2, or vice-versa, such that the wide power range rectifier circuits 176-1, 176-2 may accommodate converting EM energy of RF signals at different incoming signal power levels. In this embodiment, the Dickson voltage rectifiers are operatively coupled to the RF circulator switch, that is triggered by received EM energy power levels of the captured RF signals, to switch may dynamically switch between the plurality of Dickson voltage rectifiers within each wide power range rectifier circuit 176-1, 176-2. In embodiments herein, each of the plurality of Dickson voltage rectifiers within each wide power range rectifier circuit 176-1, 176-2 may also simply be referred to as rectifier circuits. Therefore, in an embodiment where the first Dickson voltage rectifier includes ten stages and a second Dickson voltage rectifier includes seven stages within each wide power range rectifier circuit 176-1, 176-2, the RF circulator switch, based on the detected EM power in the captured RF signals from the impedance matching networks 174-1, 174-2 and RF power combiners 172-1, 172-2, may transition from one Dickson voltage rectifier to another within each wide power range rectifier circuit 176-1, 176-2. It is appreciated that other types of rectifier circuits 176-1, 176-2 may be used and the present specification contemplates the use of these other rectifier circuits 176-1, 176-2.

In an embodiment, the plurality of metasurface unit cells 164-1, 164-2, 164-3, 164-4 may be separated into a first subgroup of metasurface unit cells 164-1, 164-2 and a second subgroup of metasurface unit cells 164-3, 164-4. In this embodiment, the first subgroup of the metasurface unit cells 164-1, 164-2 may include the SIWs to harvest power from the EM waves via the rectifier circuit 176-1, 176-2 to charge the first metasurface battery 182-1. In this embodiment, the second subgroup of the plurality of metasurface unit cells 164-3, 164-4 may, via a phase shifter, beamform the reflected EM waves towards the receiving device as described herein. In this embodiment, the second metasurface battery 182-2 may be used to power the phase shifter (e.g., varactor) and the metasurface hardware controller 170 executing machine readable code instructions of an asset tracking system 171 in order to reflect the RF signals, such as location data RF signals, back to the source transmitting device or to another receiving device.

Upon the metasurface PMU 180 detecting the second metasurface battery 182-2 reaching a lower power threshold, the metasurface PMU 180 may switch the second subgroup of metasurface unit cells 164-3, 164-4 to include their SIWs to harvest power from the EM waves via the rectifier circuit 176-1, 176-2 to charge the second metasurface battery 182-2. In this embodiment, the first subgroup of the plurality of metasurface unit cells 164-1, 164-2 may then, via a phase shifter, beamform the reflected EM waves towards the receiving device as described herein. In this embodiment, the first metasurface battery 182-1 may be used to power the phase shifter (e.g., varactor) and the metasurface hardware controller 170 executing machine readable code instructions of an asset tracking system 171 in order to reflect the RF signals, such as location data RF signals, back to the source transmitting device or to another receiving device.

As described herein, the metasurface unit cell array 162 may include one or more RF power combiners 172-1, 172-2 operatively coupled to combine the power from each subgroup of metasurface unit cells 164-1, 164-2 and from metasurface unit cells 164-3, 164-4, respectively. The respective RF power combiners 172-1, 172-2 may take input from the respective subgroup of metasurface unit cells 164-1, 164-2 or metasurface unit cells 164-3, 164-4 and sum their signals coherently such that phase coherence may be maintained across all ports.

Additionally, an impedance matching network circuit 174-1, 174-2 may be operatively coupled between the RF power combiners 172-1, 172-2 and rectifier circuits 176-1, 176-2 respectively to minimize power loss and optimize power transfer from the RF power combiner 172-1, 172-2. In an embodiment, the impedance matching networks 174-1, 174-2 may match the combined RF signals' impedance from the EM coupler signal report pads and RF power combiners 172-1, 172-2 to, for example, a nonlinear input impedance of the rectifier circuits 176-1, 176-2 for maximum power transfer.

Thus, the presently-described metasurface unit cell array 162 of embodiments herein may allow for real-time tracking of hardware assets during shipment reducing instances of lost or stolen hardware assets. Thus, a self-powering metasurface unit cells 164-1, 164-2, 164-3, 164-4 described herein can ensure continuous tracking of high-value cargo, such as electronics or pharmaceuticals, by harvesting energy from satellite signals or other RF signals within the RF environment and maintain the location data transmission throughout the journey. In an embodiment, the location data may be transmitted back to an access point, base station, satellite, or another receiving device in order to relay current location data of the hardware assets and other shipped goods. It is appreciated that this system and method may be extended to other hardware devices such as scientific equipment and server supplies sent to or through remote locations often facing harsh conditions with limited power sources. The self-sufficient tracking system within the metasurface unit cell array may ensure the safety and location of these critical scientific hardware assets, even in these extreme environments.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
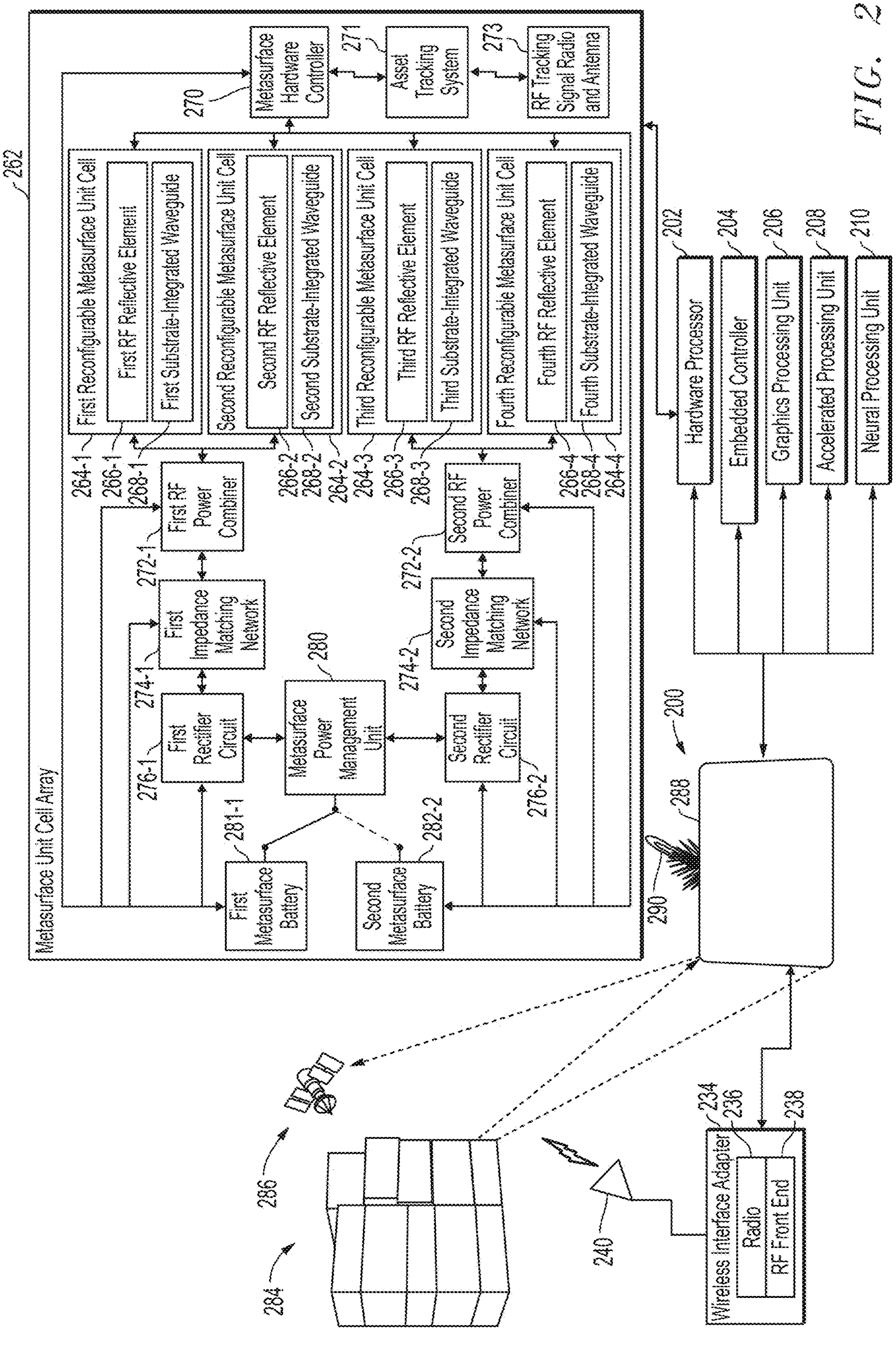
FIG. 2 is a block diagram illustrating an information handling system interfacing with a metasurface unit cell array comprising a plurality of metasurface unit cells that each include a substrate-integrated waveguide for power harvesting radiofrequency energy to track an asset such as the information handling system during transit according to an embodiment of the present disclosure.

FIG. 2 is a block diagram illustrating an information handling system 200 interfacing with a metasurface unit cell array 262 comprising a plurality of metasurface unit cells 264-1, 264-2, 264-3, 264-4 that each include a substrate-integrated waveguide (SIW) 268-1, 268-2, 268-3, 268-4 for power harvesting to power operation of the metasurface unit cell array 262 when the information handling system 200 has no battery power according to an embodiment of the present disclosure. FIG. 2 shows the information handling system 200 as a laptop-type information handling system 200. The laptop-type information handling system 200 allows for, in an embodiment, the operative coupling of the metasurface unit cell array 262 to the information handling system 200 on or within a surface of the lid portion or A-cover 288 of a display chassis of the information handling system 200. In an embodiment, the information handling system 200 may be operatively coupled to the metasurface unit cell array 262 and, in an embodiment, the metasurface hardware controller 270 via a hardware connection passing through the A-cover 288. The metasurface unit cell array 262 comprising a plurality of metasurface unit cells 264-1, 264-2, 264-3, 264-4 that each include a substrate-integrated waveguide (SIW) 268-1, 268-2, 268-3, 268-4 for power harvesting may power the metasurface hardware controller 270 to execute machine readable code instructions of an asset tracking system 270 to track hardware assets such as the information handling system 200 during transit or storage in some example embodiments herein.

FIG. 2 shows that the information handling system 200 may be packaged as one of a plurality of hardware assets in a pallet of monitored hardware assets 284 that may be shipped from the manufacturer to a user or a retail store or stored in a location during transit or awaiting sale. The information handling system 200 may be a single hardware asset that is within this pallet of monitored hardware assets 284 with each hardware asset including a metasurface unit cell array 262 associated with it either via attaching the metasurface unit cell array 262 to the information handling system 200, by including the metasurface unit cell array 262 within the housing of the information handling system 200, or even including the metasurface unit cell array 262 within the packaging of the information handling system 200. In either example, the metasurface unit cell array 262 may receive, at its surface, incident RF signals from an RF transmission source such as a satellite 286, access points, or other transmitting devices in a radiofrequency environment. As described herein, EM energy of radiofrequency signals from this satellite 286 or other transmitting device in the RF environment may be harvested via the circuits formed into the metasurface unit cell array 262.

As described herein, the metasurface unit cell array 262 may be operatively coupled to the information handling system 200. This operative coupling may include a wired coupling that allows the metasurface unit cell array 262 to provide power to, at least, the wireless interface adapter 234 of the information handling system 200 in some embodiments. This allows the metasurface unit cell array 262 to provide harvested power to the information handling system 200 after harvesting power from the incident RF signals in order to facilitate the wireless transmission of tracking location data RF signals that describe the location of the information handling system 200 (or other hardware asset). In an embodiment, the power provided to the information handling system 200 may be routed to the hardware processor 202 (or another hardware processing device 204, 206, 208, 210) for the hardware processor 202 to direct the wireless interface adapter 234 or directly to a hardware controller at the wireless interface adapter 234 to transmit this tracking location data RF signal via the antenna 240 of the information handling system. The hardware processor 202 or a hardware controller, such as an embedded controller or radio controller, may execute machine readable code instructions of the asset tracking system 270 for generation of a tracking location data RF signal. Because, in this example embodiment, the power is only provided to the hardware processor 202 or a hardware controller and the wireless interface adapter 234 (with its radio 236 and RF front end 238), power consumption may be significantly lower than powering on the entire information handling system 200. In other embodiments, harvested power may be provided to the metasurface hardware controller 270 executing machine readable code instructions of the asset tracking system 270 and an RF tracking signal radio and antenna 273 onboard the metasurface unit cell array 262 to transmit a tracking location data RF signal. In embodiments herein, harvested power is also provided to the metasurface unit cells 264-1, 264-2, 264-3, 264-4 as directed by the metasurface hardware controller 270 to reconfigure each metasurface unit cells 264-1, 264-2, 264-3, 264-4 and beamform the tracking location data RF signal back to a source transmitting device or on to a receiving device to notify a location of the hardware asset.

This transmission of a tracking location data RF signal may be sent to a receiving device that may include an access point, a base station, NTN satellite 286, or other transmitting device in the radiofrequency environment. This allows the information handling system 200 to report its location regardless of that location and the state of the battery at of the information handling system 200. In an alternative embodiment, the metasurface unit cell array 262 may include an array of metasurface unit cells 264-1, 264-2, 264-3, 264-4 that may reflect RF transmissions, such as a ping for tracking location data, back to a source transmitting device in order to report the hardware assets' location in real-time. Thus, in this embodiment, power is provided to the metasurface unit cells 264-1, 264-2, 264-3, 264-4 as directed by the metasurface hardware controller 270 to reconfigure each metasurface unit cells 264-1, 264-2, 264-3, 264-4 and beamform the reflected RF transmission back to the source transmitting device.

During operation of the metasurface unit cell array 262, each of the metasurface unit cells 264-1, 264-2, 264-3, 264-4 may harvest a portion of EM power of a received RF signal, convert that RF signal into a DC voltage and charge at least one battery 282-1, 282-2 at the metasurface unit cell array 262. In some embodiments, a metasurface power management unit (PMU) 280 will alternately charge a first battery in a dual battery system with batteries 282-1, 282-2 while using the other battery to operate the metasurface hardware controller 270 and provide power to other components including the wireless interface adapter 234 in some embodiments. In an embodiment, each of the metasurface unit cells 264-1, 264-2, 264-3, 264-4 may include a SIW 268-1, 268-2, 268-3, 268-4. The SIW 268-1, 268-2, 268-3, 268-4 may be designed to capture a portion of the incoming energy from the transmissions of the transmitting hardware devices (e.g., satellites or other RF sources). Each SIW 268-1, 268-2, 268-3, 268-4 includes an EM coupling probe within a shielded chamber to couple incident RF signals via a power interconnect within the shielded chamber. This EM energy of the coupled or captured RF signal is harnessed from multiple metasurface unit cells 264-1, 264-2, 264-3, 264-4 and their respective SIW 268-1, 268-2, 268-3, 268-4 to be aggregated using a RF power combiner 272-1, 272-2 and then converted into a DC signal using a rectifier circuit 276-1, 276-2.

In an embodiment, a metasurface PMU 280 may direct which of a first metasurface battery 282-1 or a second metasurface battery 282-2 is to be charged from the harvested power from each of the metasurface unit cells 264-1, 264-2, 264-3, 264-4. Additionally, the metasurface PMU 280 may also control which of the first metasurface battery 282-1 or second metasurface battery 282-2 to discharge and, therefore, use to power the metasurface unit cell array 262 and its metasurface hardware controller 270 for its operations to beamform reflected RF signals. Further, the discharge of harvested DC voltage may also power the tracking signal data RF signal transmissions generated by the asset tracking system 271 at either the onboard RF tracking signal radio and antenna 273 or at the wireless interface adapter 234 at the information handling system. These tracking signal data RF signals may be transmitted back to the transmitting device or onto a receiving device in order to identify and relay the location of the hardware asset (e.g., information handling system 200) associated with the metasurface unit cell array 262.

As described herein, this power may be discharged to power the wireless interface adapter 234 of the information handling system 200 so that tracking location data RF signal transmissions from the wireless interface adapter 234 (with the radio 236 and RF front end 238) may be transmitted to the source transmitting device or a receiver transmitting device in some embodiments. Further, the harvested power from one of the batteries 282-1 or 282-2 may be discharged in order to reconfigure the metasurface unit cells 264-1, 264-2, 264-3, 264-4 as described herein to beamform and reflect the tracking location data RF signals generated by the asset tracking system 271 toward the source transmitting device or a receiver transmitting device in embodiments herein. For example, power may be provided to a varactor (not shown) associated with each RF reflective element 266-1, 266-2, 266-3, 266-4 of each of the respective metasurface unit cells 264-1, 264-2, 264-3, 264-4 to adjust the capacitance and effect of the resonant structures for those RF reflective element 266-1, 266-2, 266-3, 266-4 to cause a phase-shift in reflecting RF signals. This varactor may be charged in order to alter the phase of the incoming RF signal in the reflected RF signal in order to, with the operation of the other metasurface unit cells 264-1, 264-2, 264-3, 264-4, create a phase profile across the surface of the metasurface unit cell array 262 and beamform a reflected RF signal back to the transmitting device (e.g., a satellite) or onto a different receiver device. In an embodiment, the metasurface hardware controller 270 may receive this power and control the operation of the tunable varactors associated with each of the metasurface unit cells 264-1, 264-2, 264-3, 264-4. This power harvesting allows the metasurface unit cell array 262 to self-power and operate as a stand-alone device that is associated with hardware assets to be tracked or as a metasurface unit cell array 262 that is formed as part of the information handling system 200 without separate battery power in order to relay incident RF signals among the source transmitting devices and receiver devices in a radiofrequency environment.

It is appreciated that, in an embodiment, the metasurface PMU 280 may switch between the first metasurface battery 282-1 and second metasurface battery 282-2 based on the charged levels of each of the metasurface batteries 282-1, 282-2. For example, where the second metasurface battery 282-2 has been fully discharged, the metasurface PMU 280 may switch from discharging the second metasurface battery 282-2 to the first metasurface battery 282-1 in order to provide power for transmission of the RF location signal to a receiving device. Thus, the metasurface PMU 280 may also monitor the charged states of each of the metasurface batteries 282-1, 282-2 and switch from one to the other when they have been depleted.

The SIWs 268-1, 268-2, 268-3, 268-4 may be included in only a portion of the metasurface unit cells 264-1, 264-2, 264-3, 264-4 and that portion may be configured to harvest a predetermined percentage of power from the originally received RF signal at the metasurface unit cell array while other metasurface unit cells are dedicated to reflection of RF signals for directionality and gain to extend the transmission of those RF signal in the RF environment. In an embodiment, the plurality of metasurface unit cells 264-1, 264-2, 264-3, 264-4 may be separated into a first subgroup of metasurface unit cells 264-1, 264-2, 264-3, 264-4 and a second subgroup of metasurface unit cells 264-1, 264-2, 264-3, 264-4. In this embodiment, the first subgroup of the metasurface unit cells 264-1, 264-2 may include the SIWs to harvest power from the EM waves via the rectifier circuit 276-1, 276-2 to charge the first metasurface battery 282-1. In this embodiment, the second subgroup of the plurality of metasurface unit cells 264-3, 264-4 may, via a tunable phase shifter circuit, beamform the reflected EM waves towards the receiving device as described herein. In this embodiment, the second metasurface battery 282-2 may be used to power the tunable phase shifter (e.g., tunable varactors) in order to reflect the RF signals back to the source transmitting device or on to another receiving device.

As described, the SIWs 268-1, 268-2, 268-3, 268-4 are embedded within the substrate of a portion of the metasurface unit cells 264-1, 264-2, 264-3, 264-4 to form a shielded chamber within which an EM coupler probe couples RF signal from a DC power interconnect passing through to power a varactor or other tunable phase adjustment circuit at the surface of those metasurface unit cells 264-1, 264-2, 264-3, 264-4 having SIWs. The DC power interconnect resonates the RF signal incident on the resonating structures of the RF reflective elements 266-1, 266-2, 266-3, 266-4. The EM coupler probe couples this incident RF signal and provides it to an EM coupler readout pad for aggregation with RF power combiners 272-1, 272-2 and rectification by rectifier circuits 276-1, 276-2 to generate harvested energy as a rectified DC voltage.

In an embodiment, the level of EM power in the coupled RF signal may be detected and determine which stage in a plural stage rectifier circuit 276-1, 276-2 that may be used to convert the high frequency alternating current (AC) of EM energy of the coupled RF signal received at the SIWs 268-1, 268-2, 268-3, 268-4 into the DC voltage. In some embodiments herein, the rectifier circuits 276-1, 276-2 are wide power range rectifier circuits 276-1, 276-2 that include two or more multi-stage rectifier circuits that are switchable depending on an RF signal power threshold. The multi-stage rectifier circuits 276-1, 276-2 may be a Dickson voltage rectifier that includes sets of diodes and capacitors that each define a stage. The number of stages formed within the Dickson voltage rectifier may determine the yield of power harvested as DC voltage from the plurality of metasurface unit cells with more stages yielding higher DC voltage output in embodiments herein. However, a higher number of stages for the Dickson voltage rectifier may not register and be able to efficiently rectify captured RF signals having lower EM power levels whereas Dickson voltage rectifiers with fewer states, or even one stage, can rectify those signal and still yield DC voltage for power harvesting. Although Dickson voltage rectifiers are described, it is appreciated that other types of rectifier circuits 276-1, 276-2 may be used and the present specification contemplates the use of these other rectifier circuits 276-1, 276-2.

In the embodiment of wide power range rectifier circuits 276-1, 276-2, two or more Dickson voltage rectifier circuits are used with different numbers of stages and switchable based on the detected or determined RF signal power levels of the EM waves relative to an RF signal power threshold. For example, where the number of stages is relatively high, such as nine, the DC voltage yield may be 30 to 40 volts (V). However, a nine stage Dickson voltage rectifier circuit may be inefficient below an RF signal power level of 12 dBm to convert the captured RF signal received from the plurality of associated metasurface unit cells 264-1, 264-2, 264-3, 264-4 to DC voltage output and may yield little or no voltage output. Where the number of stages is relatively low, such as one stage, a DC output voltage of 4 to 6 V may still be available at RF signal power levels of less than 12 dBm, even down to −6 or −8 dBm. It is appreciated that, as the detected RF signal power received from the plurality of metasurface unit cells 264-1, 264-2, 264-3, 264-4 is increased, an RF power detection probe may trigger an RF power dependent microwave circuit switch or RF circulator to select among two or more Dickson rectifier circuits with different number of stages within each wide power range rectifier circuit 276-1, 276-2 in embodiments herein. The values used in the examples in the present disclosure of RF signal power levels, RF signal power thresholds, and DC power output yields are simply examples for discussion purposes and may depend on several factors including the type of wide power range rectifier circuits 276-1, 276-2 used, the number of metasurface unit cells 264-1, 264-2, 264-3, 264-4, the type of metasurface unit cells 264-1, 264-2, 264-3, 264-4, the available power levels of incident RF signals, noise levels in a radiofrequency environment, and other factors.

As described herein, the metasurface unit cell array 262 may include one or more RF power combiners 272-1, 272-2 to combine the power from each metasurface unit cells 264-1, 264-2, 264-3, 264-4. EM coupler readout pads of each of the metasurface unit cells 264-1, 264-2, 264-3, 264-4 are operatively coupled to an RF power combiner 272-1, 272-2. The respective RF power combiners 272-1, 272-2 may take input from the respective groups of metasurface unit cells 264-1, 264-2, 264-3, 264-4 and sum their signals coherently such that phase coherence may be maintained across all ports.

Additionally, an impedance matching network circuit 274-1 may be operatively coupled between the RF power combiners 272-1, 272-2 and rectifier circuits 276-1, 276-2 to optimize power transfer from the RF power combiner 272-1, 272-2. In an embodiment, the impedance matching networks 274-1, 274-2 may match the combined RF signals' impedance to, for example, a nonlinear input impedance of the rectifier circuits 276-1, 276-2 for maximum power transfer and to minimize power loss in the captured RF signals.

Thus, the presently-described metasurface unit cell array 262 of embodiments herein may allow for self-powered operation of a metasurface hardware controller 270 and adjustments to directionality and gain of reflected RF signals at the surface of the metasurface unit cell array 262 via tunable phase shift circuits (e.g., tunable varactors) in embodiments herein. Further, power harvested by the SIWs 268-1, 268-2, 268-3, 268-4 and converted into the DC voltage of the presently-described may be used to power execution of an asset tracking system 271 by the metasurface hardware controller and generate tracking location data RF signals for real-time tracking of hardware assets during shipment, reducing instances of lost or stolen hardware assets. Thus, a self-powering metasurface unit cells 264-1, 264-2, 264-3, 264-4 described herein can ensure continuous tracking of high-value cargo, such as electronics or pharmaceuticals, by harvesting energy from satellite signals or other RF signals within the RF environment and maintain the location data transmission throughout the journey even if battery systems of the hardware asset are drained. In an embodiment, the location data may be transmitted back to an access point, base station, satellite, or another receiving device in order to relay current location data of the hardware assets and other shipped goods. It is appreciated that this system and method may be extended to other hardware devices such as scientific equipment and server supplies sent to remote locations.

Figure 3:
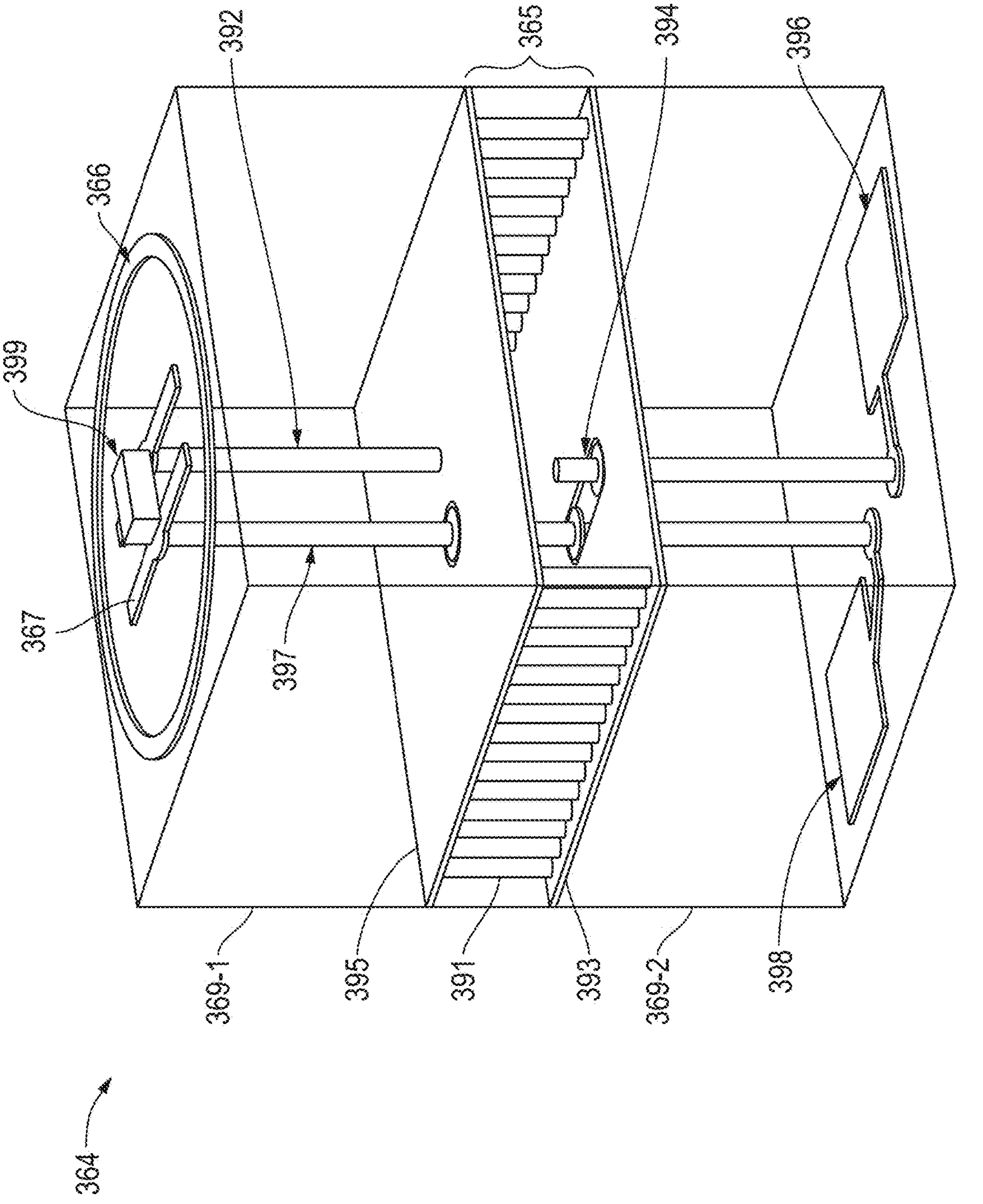
FIG. 3 is an exploded graphic diagram illustrating a perspective view of a metasurface unit cell of a metasurface unit cell array that includes a substrate-integrated waveguide (SIW) used to harvest power from incoming radiofrequency (RF) signals incident to the metasurface unit cell according to an embodiment of the present disclosure.

FIG. 3 is an exploded graphic diagram illustrating a perspective view of a metasurface unit cell 364 of a metasurface unit cell array that includes a SIW 365 used to harvest power from incoming RF signals incident to the metasurface unit cell 364 according to an embodiment of the present disclosure. It is appreciated that each of the metasurface unit cells 364 of the metasurface unit cell array (e.g., FIG. 1, 162) may comprise their own various layers or may, in an embodiment, share one or more of the same layer or layers across plural metasurface unit cell 364 in a metasurface unit cell array panel. Again, the metasurface unit cell 364 shown in FIG. 3 may be one of a plurality of metasurface unit cells 364 that form the metasurface unit cell array and may include any number of metasurface unit cells 364 arranged in any manner forming a two-dimensional panel structure such as arranged in rows and columns of metasurface unit cells 364.

In an embodiment, the metasurface unit cell 364 includes an RF reflective element 366 that is a conductive resonating structure formed onto a dielectric substrate 369-1 that is sized and spaced to resonate wavelengths of incident RF signals received at the surface of the metasurface unit cell array. Further, additional RF reflective elements 367 may be resonating structures also formed onto the dielectric substrate 369-1 that is sized and spaced to resonate wavelengths of incident RF signals received at the surface of the metasurface unit cell array. As described herein, the RF reflective element 366 and 367 may resonate at a specific resonant frequency such that EM energy is reflected from the incident RF signal. Further RF reflective elements 366 and 367 may couple to and transmit the incident RF signal down the DC voltage metal interconnect 397 formed through the dielectric substrate 369-1, 369-2 and through a shielded chamber of a substrate-integrated waveguide 365 integrated therein. This EM energy is transmitted to the SIW 365 along the DC voltage metal interconnect 397 formed to provide power to a tunable varactor 399 or other tunable phase shift circuit at the surface of the metasurface unit cell 364. As described herein, the RF signal incident to the surface of the metasurface unit cell array may be any frequency used by radiofrequency protocols operating in the radiofrequency environment, such as a 6 GHz frequency RF signal, a 20 GHz frequency RF signal, or the like. It is appreciated that, in order to resonate at a specific frequency, the RF reflective element 366 and 367 may be sized to resonate at that specific frequency (and wavelength).

In an embodiment, the SIW 365 may include a lower metallization layer 393 above a lower section of dielectric substrate 369-2 forming a bottom surface and an upper metallization layer 395 forming a top surface under an upper section of dielectric substrate 369-1. It is appreciated that the upper and lower sections of dielectric substrate 369-1, 369-2 may be one dielectric substrate with the SIW 365 formed therein, or may be two separately disposed layers of dielectric substrate during formation of the metasurface unit cell 364 in a metasurface unit cell array. The lower metallization layer 393 and upper metallization layer 395 are electrically coupled to each other via a plurality of perimeter metal interconnect bars 391 between them to form a shielded chamber in the SIW 365. These perimeter metal interconnect bars 391 are spaced at a distance to prevent wavelengths of outside RF signals from entering the SIW 365 and to hold or capture the RF signal within the SIW 365. Further, the SIW 365 includes one or more EM coupling elements in the form of an EM coupling probe 394 for capturing a portion of the EM energy or the RF signal transmitted down the DC voltage metal interconnect 397 from the RF reflective elements 366 and 367 at the surface of the metasurface unit cell 364 according to embodiments herein. The EM coupling probe 394 may be operatively coupled to an EM coupler signal readout pad 396 which interfaces with a power combiner (e.g., FIG. 1, 172-1, 172-2) that combines the power from a plurality of metasurface unit cells 364 operatively coupled to a respective RF power combiner.

As described herein, the DC voltage metal interconnect 397 may be used to transmit power to a varactor 399 coupled between the grounding rod 392 and the DC voltage metal interconnect 397. In an embodiment, a metasurface PMU (e.g., FIG. 1, 180) and metasurface hardware controller may be operatively coupled to the DC voltage metal interconnect 397 by a DC voltage pad 398 so as to receive power, such as harvested power generated by the harvesting the EM energy of RF signals coupled at the EM coupling probe 394 and EM coupler signal readout pad 396 as described herein. As power is provided to the varactor 399, the varactor 399 acts as a voltage-controlled capacitor. As an applied voltage is applied to the varactor 399 via the DC voltage metal interconnect 397, the capacitance changes at the varactor 399 which alters phase shift of resonating RF signals for reflection at the resonant structures of RF reflective elements 366 and 367. This allows the metasurface unit cell 364 to change the phase of a reflected RF wave at the metasurface unit cell 364 such that a phase profile is formed across the surface of plural metasurface unit cells of the metasurface unit cell array allowing the reflected RF single to be beamformed, via constructive or destructive interference, in directional lobes towards a receiving device such as a satellite (e.g., FIG. 2, 286). Thus, the EM energy of RF signals received at the resonating RF reflective element 366 can be converted into harvested energy as DC voltage stored at one or more batteries, as described in connection with FIGS. 1 and 2, and used to power the varactor 399 in order to make phase adjustments to control directionality of reflected the RF signals back to a receiving device or on to a receiving device. This directionality adjustment of reflected RF signals may include forming directionality lobes for reflection of tracking location data RF signals generated by execution of an asset tracking system via the metasurface controller also powered by the harvested power. The metasurface unit cell array may power an antenna system within the hardware asset (e.g., information handling system) that is being tracked or onboard the metasurface unit cell array panel via use of the SIWs 365 and rectifier circuits of the metasurface unit cell array as described in embodiments herein.

Figure 4:
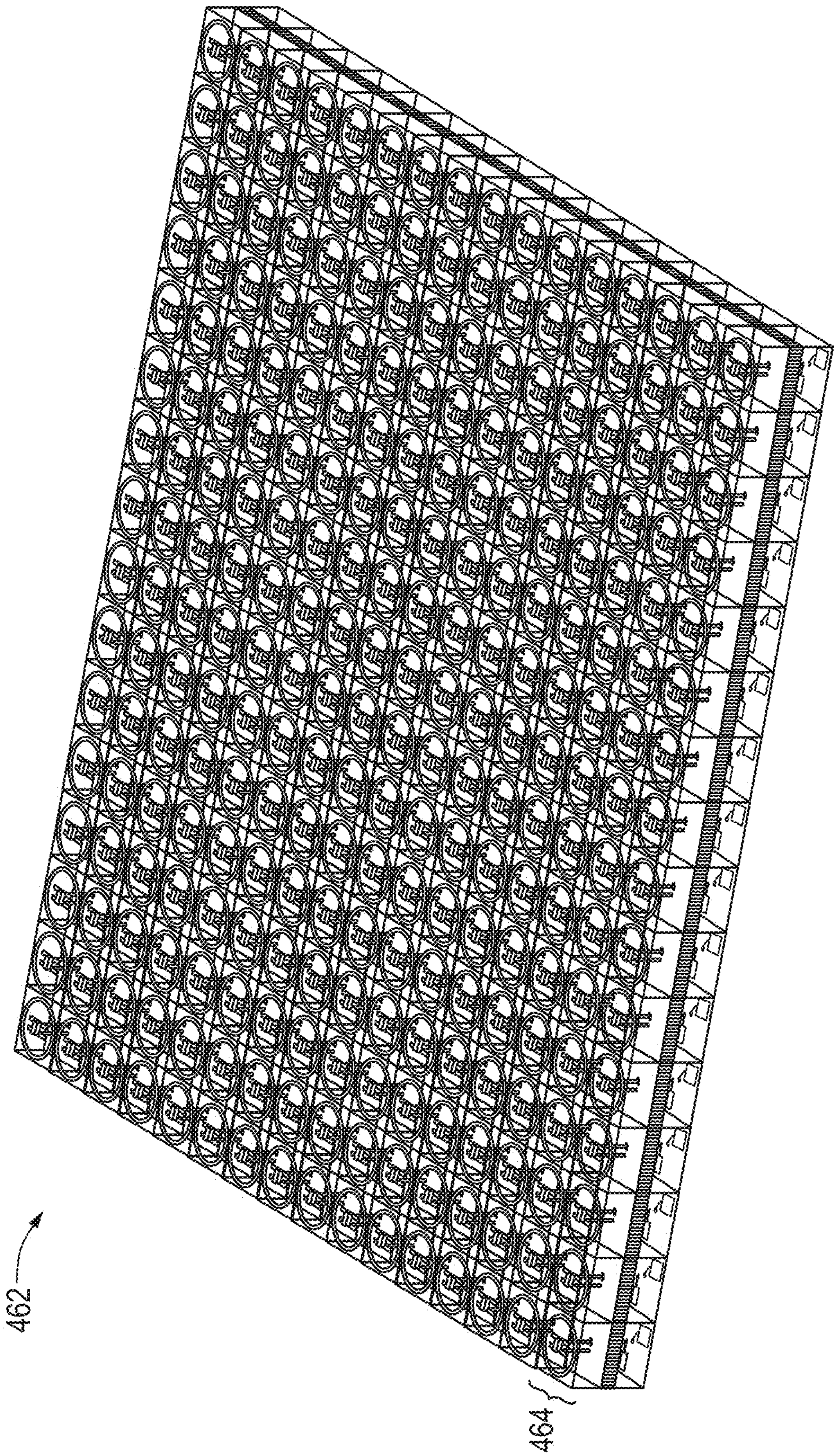
FIG. 4 is top perspective view graphic diagram showing a metasurface unit cell array comprising a plurality of metasurface unit cells having SIW portions and power harvesting according to an embodiment of the present disclosure.

FIG. 4 is top perspective view graphic diagram showing a metasurface unit cell array 462 comprising a plurality of metasurface unit cells 464 on a panel according to an embodiment of the present disclosure. The metasurface unit cell array 462 may include any number of metasurface unit cells 464 and may be arranged in any orientation on the surface of the metasurface unit cell array 462. In an embodiment, the metasurface unit cell array 462 may include an array of sixteen-by-sixteen metasurface unit cells 464 arranged in rows and columns.

As described herein, each of the EM coupler signal readout pads (e.g., FIG. 3, 396) may be operatively coupled to a power combiner (e.g., FIG. 1, 172-1, 172-2) that combines that EM energy harvested from captured RF signals at each of the metasurface unit cells 464 in order to charge one or more batteries. Additionally, the DC voltage pads 398 of each metasurface unit cell 364 may operatively couple a battery to the varactors (e.g., FIG. 3, 399) in order to create a phase profile across the surface of the metasurface unit cell array 462 and the plural metasurface unit cells 464 and beamform a reflected RF signal back to the transmitting device or on to a receiver device in a RF environment.

Figure 5:
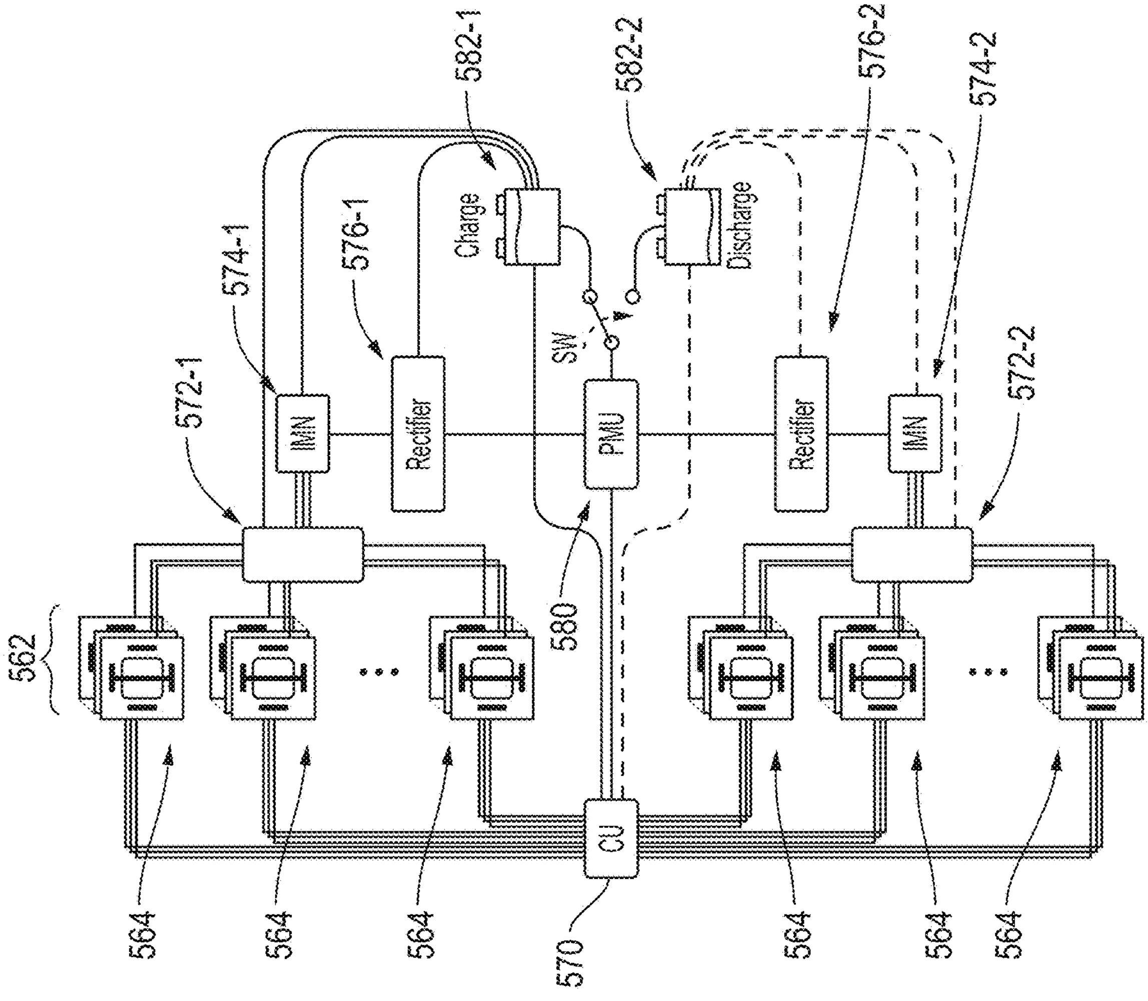
FIG. 5 is block diagram depicting a circuit diagram of a metasurface unit cell array to harvest power from incoming RF signals with a plurality of metasurface unit cells and a rectifier circuit according to an embodiment of the present disclosure.

FIG. 5 is graphic diagram depicting a circuit diagram of a metasurface unit cell array 562 to harvest power from a plurality of metasurface unit cells 564 according to an embodiment of the present disclosure. In these embodiments, the harvesting of the EM energy from the metasurface unit cells 564 may be done in a row by row or column by column basis where the metasurface unit cells 564 are arranged in rows and columns such as shown in FIG. 4. During operation of the metasurface unit cell array 562, each of the metasurface unit cells 564 may harvest a portion of power of a received RF signal, convert that captured RF signal into a DC voltage, and charge at least one battery 582-1, 582-2 at the metasurface unit cell array 562. In an embodiment, each of the metasurface unit cells 564 may include a SIW. The SIW may be designed with an EM coupling probe to capture a portion of the incoming EM energy from the captured RF signal transmissions of the transmitting hardware devices (e.g., satellites or other RF sources) in a radiofrequency environment. This energy, harnessed from multiple metasurface unit cells 564 and their respective SIWs is aggregated using a RF power combiner 572-1, 572-2 and then converted into a DC signal using a rectifier circuit 576-1, 576-2 according to embodiments herein. In an embodiment, an impedance matching network 574-1, 574-2 may be operatively coupled between the RF power combiners 572-1, 572-2 and rectifier circuits 576-1, 576-2 to optimize power transfer from the RF power combiner 572-1, 572-2 to the rectifier circuits 576-1, 576-2.

In an embodiment, a metasurface PMU 580 may direct which of a first metasurface battery 582-1 or a second metasurface battery 582-2 is to be charged from the harvested power from each of the metasurface unit cells 564. Additionally, the metasurface PMU 580 may also control which of the first metasurface battery 582-1 or second metasurface battery 582-2 to discharge and, therefore, use to power operations of the metasurface unit cell array 562 and the metasurface hardware controller 570 controlling directional beamforming and other functions of the metasurface unit cells 564 in embodiments herein. In further embodiments, harvested power may power the metasurface controller 570 to execute machine readable code instructions of an asset tracking system to generate tracking location RF signal transmissions back to the transmitting device or on to receiving devices in order to identify and relay the location of the hardware asset (e.g., information handling system FIG. 2, 200) associated with the metasurface unit cell array 562.

As described herein, the power may be discharged in order to power the metasurface controller 570 and provide power to tunable phase shifting circuits to reconfigure the metasurface unit cells 564 as described herein. For example, power may be provided to a tunable varactor (not shown) associated with RF reflective elements of each of the several metasurface unit cells 564. This tunable varactor may be provided voltage to adjust capacitance at or across RF reflective elements in order to alter the phase of the incoming RF signal in a reflected RF signal in order to, with the operation of the other metasurface unit cells 564 create a phase profile across the surface of the metasurface unit cell array 562. With the phase profile across plural metasurface unit cells 564, the metasurface unit cell array 562 may be controlled to directionally beamform a reflected RF signal back to the transmitting device (e.g., a satellite) or on to a receiving wireless device in an RF environment. In an embodiment, the metasurface hardware controller 570 may receive this harvested power and control the operation of the varactors associated with each of the metasurface unit cells 564. This allows the metasurface unit cell array 562 to self-power and operate as a stand-alone device that is associated with hardware assets to be tracked or as part of the information handling system in order to relay an RF signal, such as a return RF signal or generated tracking location RF signals for asset tracking in embodiments herein. It is appreciated that, in an embodiment, the metasurface PMU 580 may switch between the first metasurface battery 582-1 and second metasurface battery 582-2 based on the charged levels of each of the metasurface batteries 582-1, 582-2 and may also monitor the charged states of each of the metasurface batteries 582-1, 582-2 and switch from one to the other when they have been depleted using a power switch.

The SIWs of each of the metasurface unit cells 564 may be configured to harvest a power from the originally received RF signal by coupling that RF signal with an EM coupling probe from a power interconnect pulling the RF signal from the RF reflective elements on the surface of the metasurface unit cells 563. In an embodiment, the amount of RF signal power in captured RF signals may define what type of rectifier circuit 576-1, 576-2 that may be used to convert the high frequency AC of the EM energy for captured RF signals received at the SIWs into the DC voltage. In an embodiment, the rectifier circuits 576-1, 576-2 may include plural stages of a Dickson voltage rectifier that includes sets of diodes and capacitors that each define a stage. In this embodiment, the number of stages formed within the Dickson voltage rectifier is selected based on expected RF signal power to be received as well as for optimizing the DC voltage harvested from the plurality of metasurface unit cells. For example, where RF signal power is relatively high, such as expected above a certain dBm level, more stages, for example nine, may be used to yield a voltage at 30 to 40 volts (V). However, where the RF signal power is relatively lower, the number of stages used is lower to be able to capture and rectify some EM energy from the captured RF signal that a larger number of stages may be unable to do or have limited power harvesting. However, lower number of stages of the rectifier circuit 576-1, 576-2 yields lower DC voltage output, for example, with one stage it may be between 8 to 10 V. The above output voltage values and RF signal power levels yielding those output voltage are exemplary only and the system of the present embodiments may vary widely depending on a number of factors including number and type of metasurface unit cells, strength of RF signals, interference conditions, and other factors as described herein. It is appreciated that, as the expected RF signal power to be received from captured RF signals by the plurality of metasurface unit cells 564 is increased, the number of stages within the Dickson rectifier circuit may also increase to yield better harvested power DC voltage in some embodiments. Similarly, as the expected RF signal power to be received from captured RF signals by the plurality of metasurface unit cells 564 is lower, the number of stages within the Dickson rectifier circuit may also be lower to ensure some yield of harvested power DC voltage, albeit at a lower voltage level, in embodiments herein.

In some embodiments, the rectifier circuits 576-1, 576-2 are wide power range rectifier circuits 576-1, 576-2 may include a plurality of plural stage Dickson voltage rectifiers that are switchable depending on detected RF signal power. In this embodiment, the rectifier circuit 576-1, 576-2 may include a plurality of multi-stage Dickson voltage rectifiers that each include sets of diodes and capacitors that each define the plural stages that differ between each of the switchable voltage rectifiers circuits within each of the wide power range rectifier circuits 576-1, 576-2. In this embodiment, the plurality of multi-stage Dickson voltage rectifiers are operatively coupled to an RF circulator switch in each of the wide power range rectifier circuits 576-1, 576-2 as described in further detail in FIG. 7. This RF circulator switch may dynamically switch between the plurality of multi-stage Dickson voltage rectifiers of the wide power range rectifier circuits 576-1, 576-2 based on the detected RF signal power detected at an RF signal power probe and then switch the RF circulator switch depending on an RF signal power threshold. This is described further below in FIG. 7.

Figure 6:
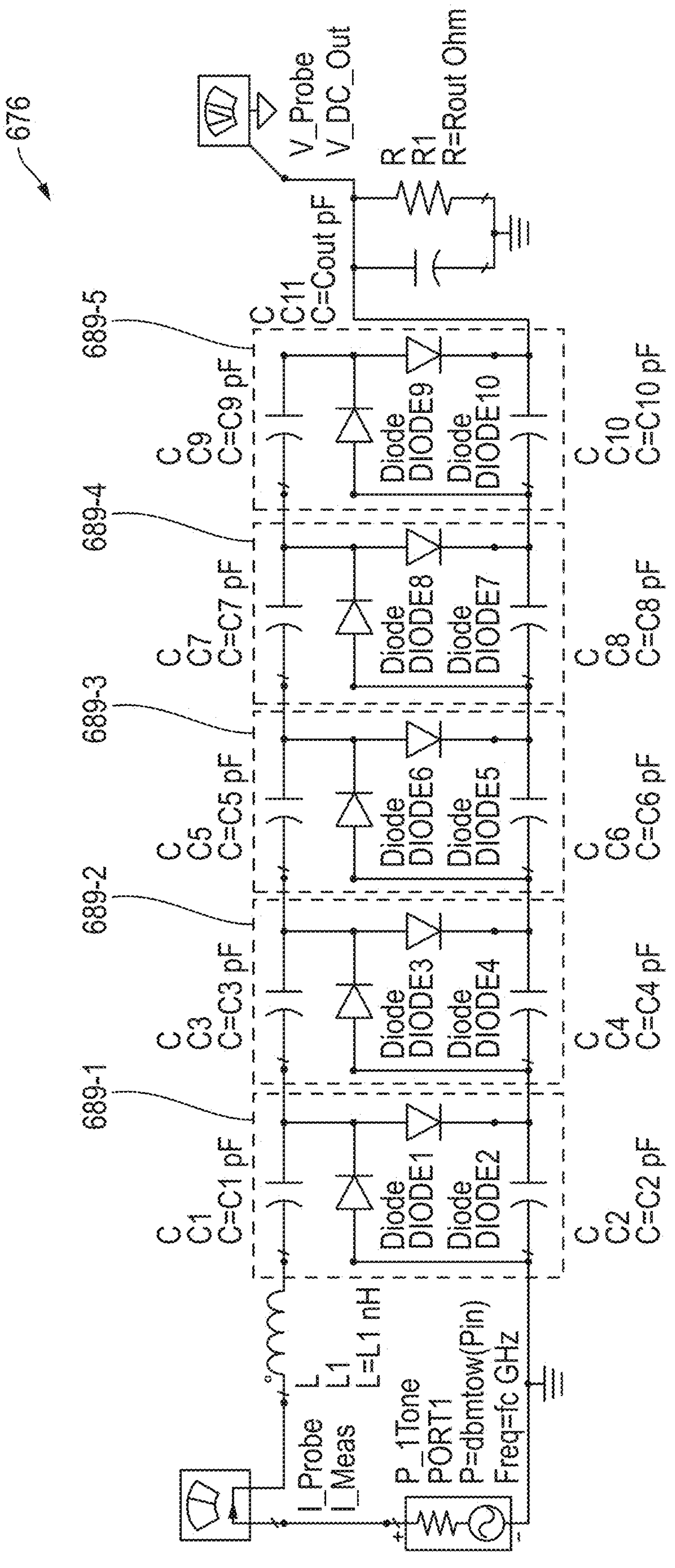
FIG. 6 is a circuit diagram of a rectifier circuit to harvest captured RF energy within a metasurface unit cell array according to another embodiment of the present disclosure.

FIG. 6 is a circuit diagram of a plural stage rectifier circuit 676 within a metasurface unit cell array according to another embodiment of the present disclosure. It is appreciated that the rectifier circuit 676 shown in FIG. 6 may be one of many rectifier circuits 676 formed on the metasurface unit cell array in order to rectify EM energy of RF signals captured via SIWs at each of the reconfigurable unit cells or a subset thereof on the metasurface unit cell array described herein.

In an embodiment, the amount of RF signal power of incoming RF signals to the metasurface unit cell array may define what type of rectifier circuit 676, including the number of stages 689-1 through 689-5 that may be used to convert the high frequency AC of the EM energy of the RF signal captured at the SIWs of the metasurface unit cells into harvested power as the DC voltage output described herein. In an embodiment, the rectifier circuits 676 may include a Dickson voltage rectifier that includes sets of diodes and capacitors that each define a stage 689-1, 689-2, 689-3, 689-4, 689-5. In this embodiment, the number of stages formed within the Dickson voltage rectifier is selected based on the RF signal power range expected of incoming RF signals as well as the desired DC voltage harvested from the plurality of metasurface unit cells. For example, the rectifier circuit 676 may include a first stage 689-1, a second stage 689-2, a third stage 689-3, a fourth stage 689-4, and a fifth stage 689-5. In this example, where the voltage desired is relatively high, such as at 15 to 20 V, the number of stages 689-1 through 689-5 may be selected, such as five in the current embodiment, in order to accommodate and register for efficient rectification the expected RF signal power of captured RF signals as well as to optimize the output harvested power DC voltage to charge one or more batteries via the metasurface PMU. Again, it is appreciated that as the RF signal power to be received by the plurality of metasurface unit cells is increased, the number of stages within the Dickson rectifier circuit may also be increased to improve yield of harvested power DC voltage output in embodiments herein. Similarly, when the RF signal power to be received by the plurality of metasurface unit cells is lower, the number of stages within the Dickson rectifier circuit used is also lower enable registering and rectification of the EM energy of the captured RF signals as harvested power DC voltage output despite low RF signal power in embodiments herein.

Figure 7:
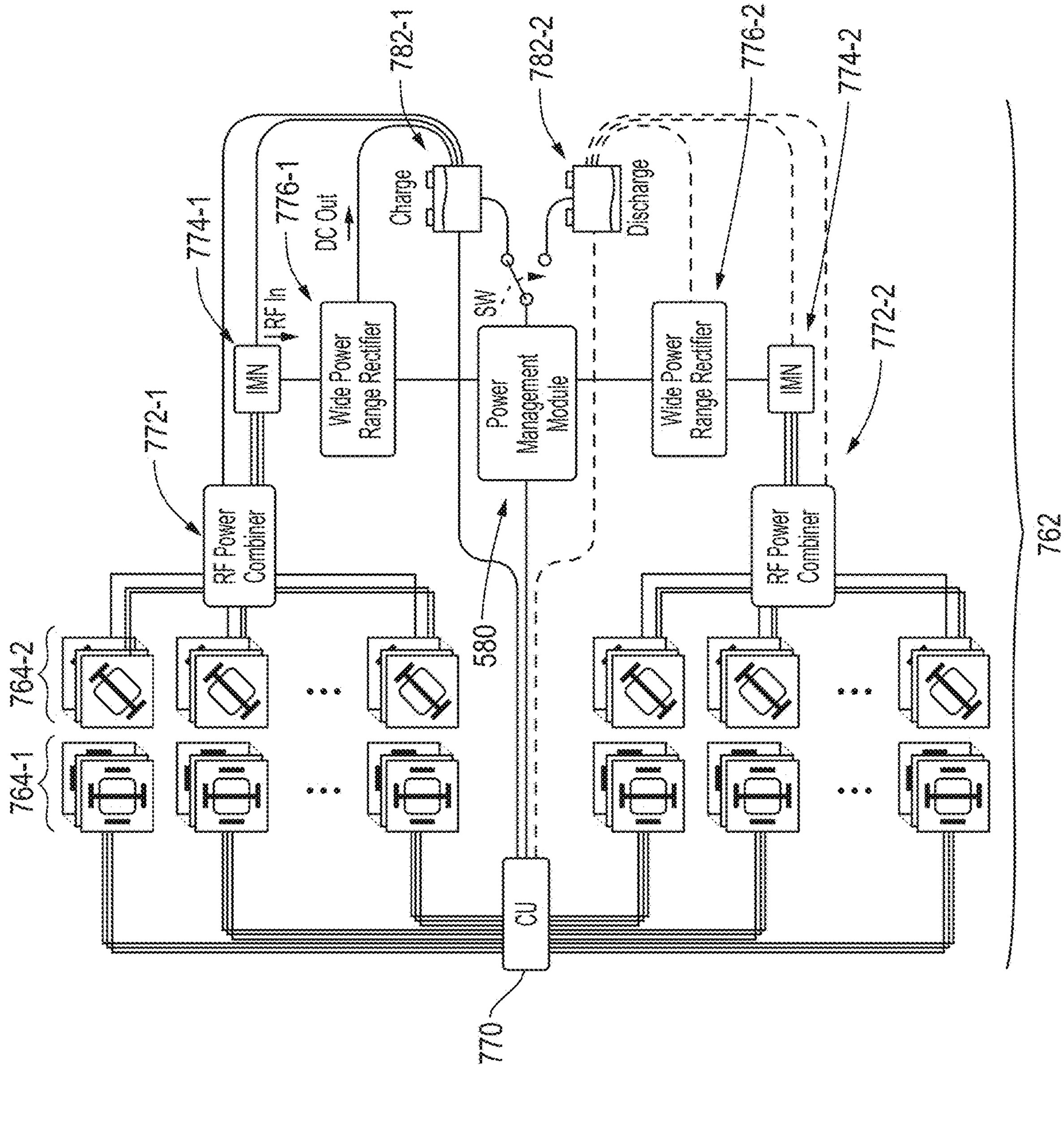
FIG. 7 is block diagram depicting a circuit diagram of a metasurface unit cell array to harvest power from incoming RF signals with a first portion of a plurality of metasurface unit cells and to reflect RF signals with second portion of the plurality of metasurface unit cells according to another embodiment of the present disclosure.

FIG. 7 is block diagram depicting a circuit diagram of a metasurface unit cell array 762 to harvest power from a plurality of metasurface unit cells 764-2 with one or more wide power range rectifier circuits 776-1, 776-2 according to another embodiment of the present disclosure. In these embodiments, the harvesting of the EM energy of RF signals incident on the metasurface unit cells 764-2 may be done in a row by row or column by column basis where the metasurface unit cells 764-2 are arranged in rows and columns such as shown in FIG. 4, for example. During operation of the metasurface unit cell array 762, each of the metasurface unit cells 764-1 in a first subgroup may reflect and redirect incoming RF signals within a radiofrequency environment under control of a metasurface hardware controller 770 to further propagate and reflect those RF signals for directionality and gain to receiver devices. The metasurface hardware controller 770 may control a tunable phase-adjustment circuit, such as a tunable varactor, to adjust phase change of reflected RF signals at each of the first subgroup of metasurface unit cells 764-1 for adjusting directionality and gain of the reflected RF signals across the first subgroup of metasurface unit cells 764-1 of the metasurface unit cell array 762.

During operation of the metasurface unit cell array 762, each of the metasurface unit cells 764-2 in a second subgroup may harvest a portion of power of a received RF signal, convert that RF signal into a DC voltage and charge at least one battery 782-1, 782-2 at the metasurface unit cell array 762. In an embodiment, each of the metasurface unit cells 764-2 may include a SIW with an EM coupling probe and a power interconnect within an integrated shielded chamber, where the power interconnect resonates with the incident RF signal from the one or more resonant structures formed on an outer surface of each of the metasurface unit cells 764-2 in the second subgroup. The SIW may be designed to capture a portion of the incoming EM energy from the RF signal transmissions of the transmitting hardware devices (e.g., satellites or other RF sources) that are incident on the resonant structures on the surface of the metasurface unit cells 764-2. This EM energy of the RF signals is coupled via the EM coupling probe and harnessed from multiple metasurface unit cells 764-2 and their respective SIWs to be aggregated using a RF power combiner 772-1, 772-2 and then converted into a DC signal using wide power range rectifier circuits 776-1, 776-2 in an embodiment described herein. In an embodiment, an impedance matching network 774-1, 774-2 may be operatively coupled between the RF power combiners 772-1, 772-2 and wide power range rectifier circuits 776-1, 776-2 to reduce power loss and optimize power transfer of the captured RF signals from the RF power combiner 772-1, 772-2 to the variable impedance of the wide power range rectifier circuits 776-1, 776-2 in some embodiments.

In an embodiment, a metasurface PMU 780 may direct which of a first metasurface battery 782-1 or a second metasurface battery 782-2 is to be charged from the harvested power from each of the metasurface unit cells 764-2. Additionally, the metasurface PMU 780 may also control which of the first metasurface battery 782-1 or second metasurface battery 782-2 to discharge to power the metasurface hardware controller 770 to execute machine readable code instructions of an asset tracking system to generate or reflect transmissions back to the transmitting device or onto a receiving device as tracking location data RF signals in order to identify and relay the location of the hardware asset (e.g., information handling system FIG. 2, 200) associated with the metasurface unit cell array 762. As described herein, the power may be discharged may also be used by the metasurface hardware controller 770 to tune tunable phase shift circuits, such as a tunable varactor in some embodiments, in order to reconfigure the metasurface unit cells 764 for directionality and gain of reflected RF signals, including tracking location data RF signals, in embodiments herein. For example, power may be provided to a varactor (not shown) associated with the resonant structures of RF reflective elements across a plurality of the respective metasurface unit cells 764-1 acting as the RF signal reflection unit cells. This varactor may be provided voltage or current to adjust capacitance in order to alter the phase of the reflection of the incoming RF signal in order to, with the operation of the other metasurface unit cells 764-1, create a phase profile across the surface of the metasurface unit cell array 762. With this controlled phase profile across the plurality of metasurface unit cells 764-1, the metasurface unit cell array 762 beamforms a reflected RF signal, such as a tracking location RF signal, back to a satellite or onto another receiver device in example embodiments.

In an embodiment, the metasurface hardware controller 770 may receive harvested power from the second group of metasurface unit cells 764-2, and control the operation of the varactors associated with each of the first group of metasurface unit cells 764-1. This allows the metasurface unit cell array 762 to operate as a stand-alone device that is associated with hardware assets to be tracked or in conjunction with the metasurface unit cell array 762 of the information handling system in order to relay a return RF signals within a radiofrequency environment with or without involving an asset tracking system. It is appreciated that, in an embodiment, the metasurface PMU 780 may switch between the first metasurface battery 782-1 and second metasurface battery 782-2 based on the charged levels of each of the metasurface batteries 782-1, 782-2 and may also monitor the charged states of each of the metasurface batteries 782-1, 782-2 and switch from one to the other when they have been depleted using a power switch. As shown in FIG. 7, therefore, the metasurface unit cells 764-1, 764-2 may be split into two subgroups. A first subgroup of the plurality of metasurface unit cells 764-2 comprising the SIWs harvest power from the EM waves of captured RF signals via the rectifier to charge the first battery. Additionally, a second subgroup of the plurality of metasurface unit cells 764-1 comprising metasurface unit cells 764-1 beamform, via a tunable phase shifter circuit, the reflected EM waves towards the receiving device.

The metasurface unit cells 764-1, 764-2 may be configured to harvest a predetermined percentage of power from the originally received RF signal based on the SIWs implemented in a first portion of metasurface unit cells 764-1 relative to a second portion of metasurface unit cells 764-2 dedicated to reflecting incoming RF signals. Further, the metasurface unit cell array 762 of FIG. 7 may include wide power range rectifier circuits 776-1, 776-2 to accommodate a wider range of EM power from captured incoming RF signals at the metasurface unit cell array 762. In an embodiment, the amount of EM power of the incoming captured RF signals may define what type of switchable rectifier circuit having differing number of stages within each of the wide power range rectifier circuits 776-1, 776-2 that may be used to convert the high frequency AC of the EM energy of the RF signals captured in the SIWs into the harvested DC voltage to charge the metasurface batteries 782-1, 782-2. In an embodiment, the wide power range rectifier circuits 776-1, 776-2 may each include a plurality of Dickson voltage rectifiers each having differing number of stages that are switchable based on detected EM power of the captured RF signals. In this embodiment, the wide power range rectifier circuits 776-1, 776-2 may each include a plurality of Dickson voltage rectifiers that each include sets of diodes and capacitors that are used to define a stage within the Dickson voltage rectifiers. In the embodiment of FIG. 7, the plural Dickson voltage rectifier sets within each of the wide power range rectifier circuits 776-1, 776-2 are operatively coupled to an RF circulator switch (not shown). This RF circulator switch may dynamically switch between the first Dickson voltage rectifier having a first number of stages and a second Dickson voltage rectifier having a second number of stages based on the level of EM power in the captured RF signals received at the RF circulator.

The RF circulator, based on the EM AC power level of the received RF signal from the impedance matching networks 774-1, 774-2 and RF power combiners 772-1, 772-2, may transition the captured RF signal from one Dickson voltage rectifier to another within each wide power range rectifier circuits 776-1, 776-2 in embodiments herein. Therefore, in one embodiment the the first Dickson voltage rectifier includes ten stages and a second Dickson voltage rectifier includes seven stages within each of the wide power range rectifier circuits 776-1, 776-2. Where the EM AC power level of the received RF signal is detected below a first threshold, the RF circulator turns off and by default routes the captured RF signal to the second Dickson voltage rectifier to accommodate that lower EM AC power of the captured RF signal to still harvest some DC voltage, albeit at a lower DC voltage level in the example embodiment. Where the EM AC power level of the received RF signal is detected above a first threshold, the RF circulator turns on and routes the captured RF signal to the first Dickson voltage rectifier to accommodate that higher EM AC power of the captured RF signal with a larger number of stages to harvest power at a higher DC voltage level in the example embodiment. In embodiments of the present invention, the RF circulator may be a vanadium dioxide ($VO_2$) switch that is susceptible to actuate upon receipt of higher captured RF signal power levels, such as at or above an RF signal EM energy power level, to route the captured RF signal in the microwave circuit to the Dickson voltage rectifier having more stages in each of the wide power range rectifier circuits 776-1, 776-2.

Figure 8:
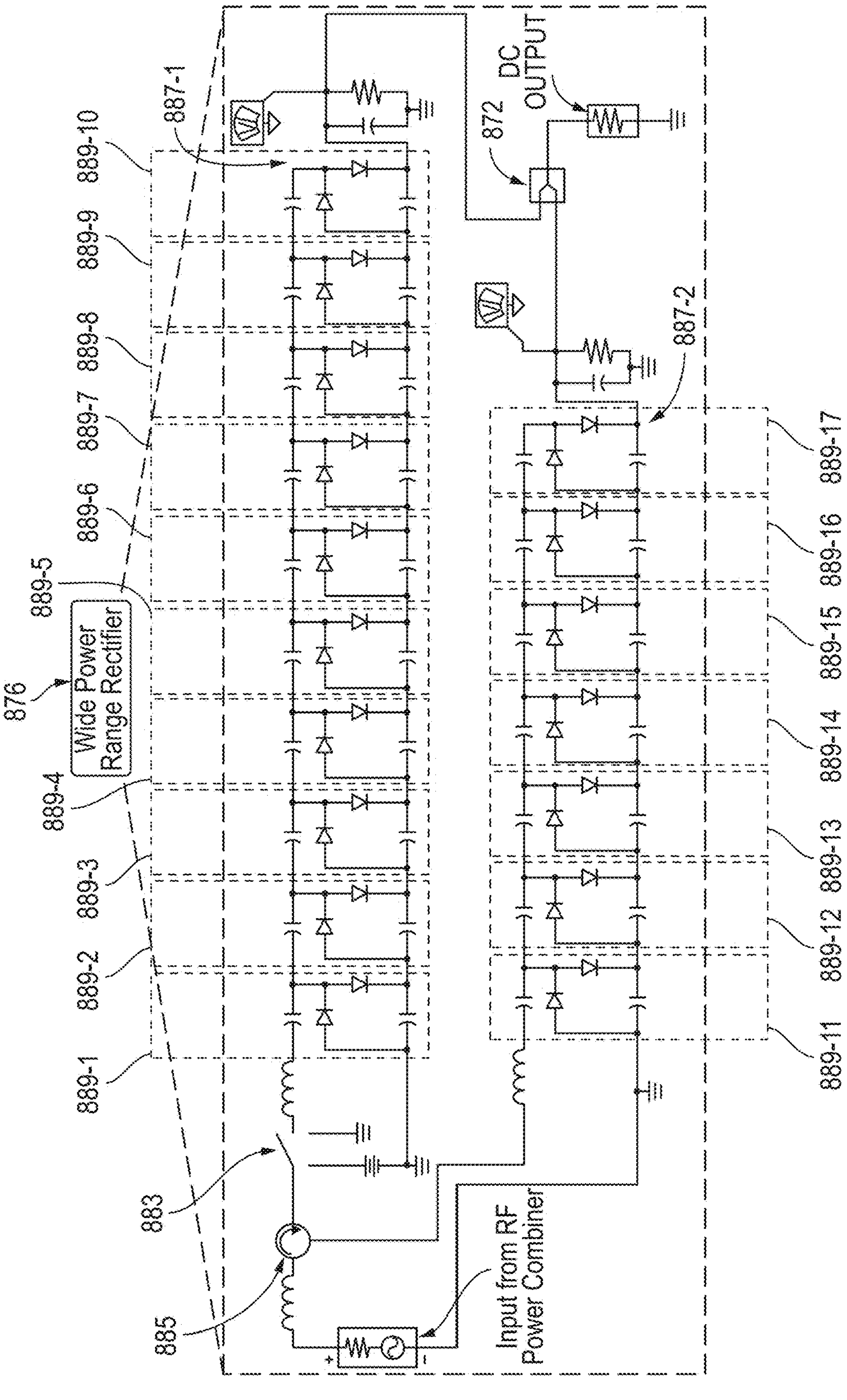
FIG. 8 is a circuit diagram of a dual-stage rectifier circuit to harvest captured RF energy at varying power levels of incoming RF signals within a metasurface unit cell array according to another embodiment of the present disclosure.

FIG. 8 is a circuit diagram of a dual-stage wide power range rectifier circuit 876 within a metasurface unit cell array according to an embodiment of the present disclosure. As described herein, a wide power range rectifier circuit 876 may include a plurality of Dickson voltage rectifiers 887-1, 887-2 to accommodate varying EM power levels of captured RF signals from metasurface unit cells. In the embodiment, shown in FIG. 8, the rectifier circuit 876 may include a first Dickson voltage rectifier 887-1 with a first, larger number of stages 889-1 through 889-10 and a second Dickson voltage rectifier 887-2 with a second, fewer number of stages 889-11 through 889-17.

In the shown embodiment, the first Dickson voltage rectifier 887-1 may include ten stages 889-1, 889-2, 889-3, 889-4, 889-5, 889-6, 889-7, 889-8, 889-9 and 889-10. In this example, where the EM power of the capture RF signal is relatively high, this first Dickson voltage rectifier 887-1 with more stages 889-1 through 889-10 may yield a higher captured power voltage, as at 35 V or higher. In this case, the greater number of stages than second Dickson voltage rectifier 887-2, provides higher harvested power DC voltage to the metasurface PMU to charge one or more batteries. However, the first Dickson voltage rectifier 887-1 may not register EM power from received RF signals below an threshold RF signal power level. For example, the first Dickson voltage rectifier 887-1 with ten stages 889-1 through 889-10 may fail to register and convert to DC voltage for power harvesting from captured RF signals below-3 dBm or another threshold RF signal power level.

In such embodiments where the captured RF signal is below the threshold RF signal power level (e.g., −3 dBm in one example), a second Dickson voltage rectifier 887-2 may also be included within the wide power range rectifier circuit 876 that includes fewer stages 889-11 through 889-17. For example, the second Dickson voltage rectifier 887-2 may include seven stages 889-11, 889-12, 889-13, 889-14, 889-15, 889-16, and 889-17 in the shown embodiment. This second Dickson voltage rectifier 887-2 may handle captured RF signal EM power levels of RF signals captured from the metasurface unit cells below the threshold RF signal power level (e.g., below-3 dBm). The tradeoff of the second Dickson voltage rectifier 887-2 is that while it will still capture and convert DC voltage from lower EM power RF signals below the RF signal power threshold, that harvested power level DC voltage is lower, such as at around 20 to 30 V in one example embodiment.

As described herein, the dual Dickson voltage rectifiers 887-1, 887-2 of the wide power range rectifier circuit 876 are operatively coupled to an RF circulator switch 885. This circulator switch 885 may dynamically switch to route captured RF signals to the first Dickson voltage rectifier 887-1 at higher EM power levels and default to the second Dickson voltage rectifier 887-2 at lower EM power levels of the captured RF signals received at the RF circulator switch 885 via the microwave circuit. An RF signal power probe may be used in the wide power range rectifier circuit 876 to determine incoming RF signal power levels and provide control current to the RF circulator switch 885 as shown. In an embodiment, the RF circulator switch 885 is a $VO_2$ microwave circuit switch whose conductivity may be altered with this control current to reroute the captured RF signal to the first Dickson voltage rectifier 887-1 with more stages when turned on based on RF signal power above the RF signal power threshold. When the RF signal power detected at the RF signal power probe falls below the RF signal power threshold, the RF circulator switch turns off and the captured RF signal is routed by default to the second Dickson voltage rectifier 887-2.

Therefore, in an embodiment where the first Dickson voltage rectifier 887-1 includes ten stages 889-1 through 889-10 and the second Dickson voltage rectifier 887-2 includes seven stages 889-11 through 889-17, the RF circulator switch 885, based on the detected EM power level of the captured RF signals received from the impedance matching networks (e.g., FIG. 1, 174-1, 174-2), RF power combiners (FIG. 1, 172-1, 172-2) and the EM coupler signal reporting pads of the metasurface unit cells, may transition from one Dickson voltage rectifier 887-1, 887-2 to another or vice versa. It is appreciated that other types of rectifier circuits 887-1, 887-2 may be used with the dual-stage wide power range rectifier circuit 876 and the present specification contemplates the use of these other rectifier circuits 876. In an embodiment, where the incoming EM power levels of the captured RF signal is at or above an RF power threshold level that is +18 dBm in an embodiment, the RF circulator switch 885 may activate a power dependent RF switch 883, such as a $VO_2$ switch, to route the captured RF signal from the RF power combiners to the first Dickson voltage rectifier 887-1 with ten stages 889-1 through 889-10 to convert the incoming EM energy of the RF signal by rectifying the AC RF signal into a DC output voltage to harvest power as described. This DC output voltage from the first Dickson voltage rectifier 887-1 with ten stages 889-1 through 889-10 is relatively higher than the DC output voltage that may be yielded from the second Dickson voltage rectifier 887-2 with seven stages 889-11 through 889-17 However, where the incoming EM energy of the RF signal is below an RF signal power threshold level such as +18 dBm, the RF circulator switch 885 may be off such that the power dependent RF switch 883 is open and the captured RF signal is defaulted to the second Dickson voltage rectifier 887-2 to convert the incoming EM energy of the captured RF signal into a DC output voltage as described. It is appreciated that the first and second Dickson rectifier circuits 887-1, 887-2 may be any type of rectifier circuits used in the wide power range rectifier circuit 876 in embodiments herein. Further, the RF circulator switch 885 with power dependent switch 883 may be any type of RF circulator switch 885 and may be an integrated circuit or waveguide circulator for routing the incoming captured RF signals. In an embodiment, the circulator switch 885 may be, for example, an adaptive integrated CMOS circulator, a film bulk acoustic resonator (FBAR) circulator, or a junction circulator. Additionally, it is appreciated that the circulator switch 885 may include any number of ports in order to accommodate additional Dickson voltage rectifiers 887-1, 887-2 than that shown in FIG. 8 in additional embodiments to cover a wider power range from incoming captured RF signals.

Figure 9:
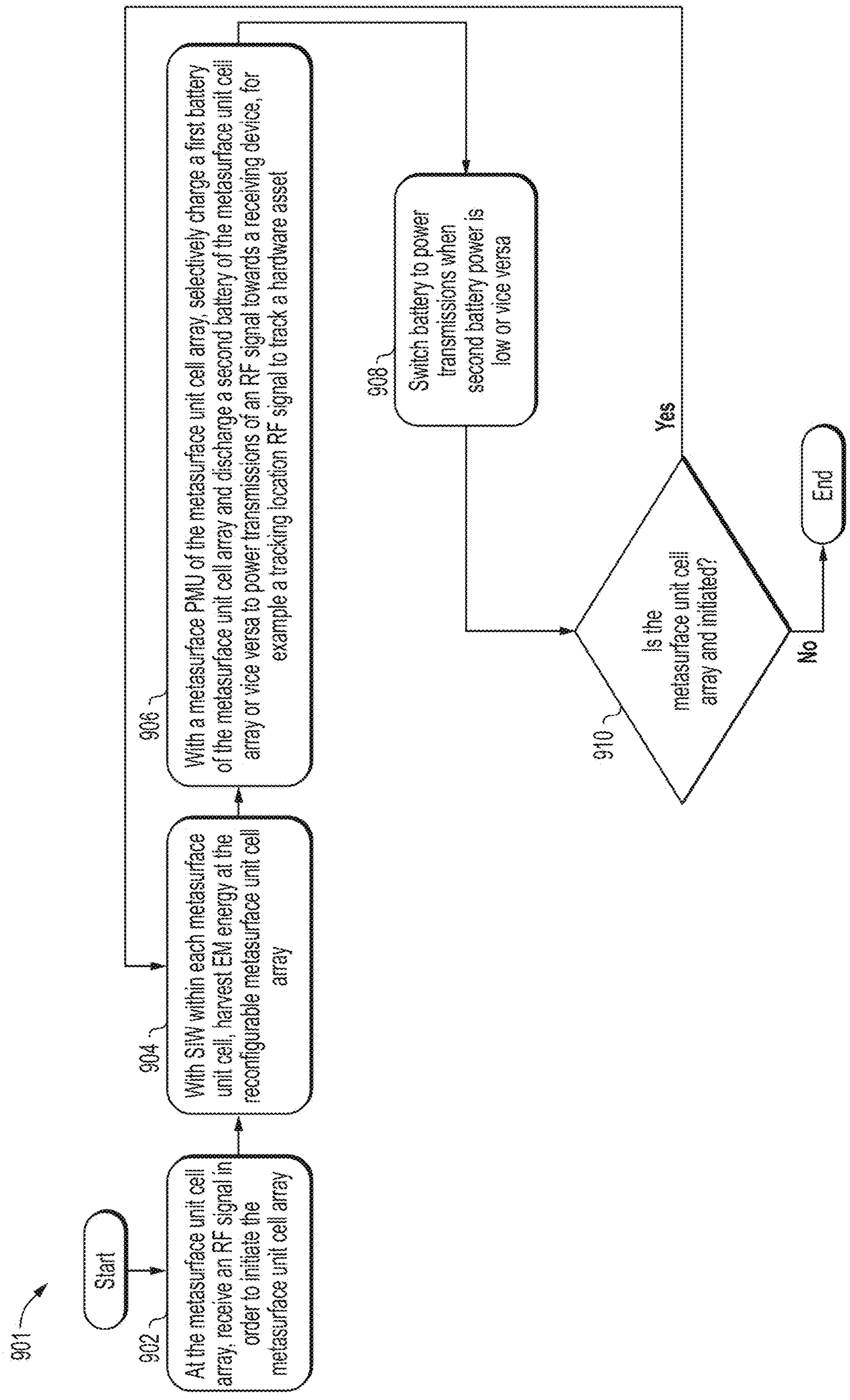
FIG. 9 is a block diagram of a method of harvesting power of incoming RF signals at a metasurface unit cell array having a plurality of SIWs to charge a dual battery system and powering a system for tracking assets associated with the metasurface unit cell array according to an embodiment of the present disclosure.

FIG. 9 is a block diagram of a method 901 of harvesting power at a metasurface unit cell array to power the metasurface unit cell array for operation to directionally reflect RF signals with the metasurface unit cell array according to an embodiment of the present disclosure. The method 901 described herein may be conducted using the metasurface unit cell array as described in connection with, for example, FIGS. 1 and 2.

At block 902, the method 901 may include receiving an incoming RF signal at the metasurface unit cell array from a radiofrequency environment. As described herein, this is done to initiate the metasurface unit cell array by providing a level of power via operation of the SIW embedded within the substrate of a plurality of the metasurface unit cells of the metasurface unit cell array upon receiving the incident RF signal from the radiofrequency environment according to embodiments herein.

At block 904, the method 901 may include harvesting that EM energy at the metasurface unit cell array with the SIWs. Some or all of the metasurface unit cells of the metasurface unit cell array may include an SIW having a shielded chamber with a power interconnect bringing in signal from resonant structures formed on the surface of the metasurface unit cell and an EM coupler probe in embodiments herein. The SIW may be designed to capture a portion of the incoming EM energy from the RF signal transmissions of the transmitting hardware devices (e.g., satellites or other RF sources) in the radiofrequency environment by coupling it using the EM coupler probe and an EM coupler probe RF signal report pad of the metasurface unit cell. This EM energy of the incident RF signal is harnessed from multiple metasurface unit cells and their respective SIWs and aggregated using a RF power combiner. The RF power combiner may then provide the captured and combined RF signal to a rectifier circuit, via an impedance matching circuit, to be converted into a DC voltage for harvesting power from the incident RF signals at the metasurface unit cell array.

At block 906, with a metasurface PMU of the metasurface unit cell array, the first battery may be selectively charged while a second battery of the metasurface unit cell array may be discharged to power adjustment to reflections of the incident RF signal towards a receiving device. As described herein, this reflected RF signal may be extend the reach of RF signals in an RF environment via control of directionality and gain of reflection with the metasurface unit cell array via use of the varactors or another tunable phase adjustment circuit across the metasurface unit cells. In an embodiment, only a subgroup of the metasurface unit cells may be used to capture the incident RF signals via SIW and harvest power from the EM waves of the RF signals with the rectifier circuits to charge the first batter (or second battery if the first battery is charged). The second battery (or first battery instead if charged) may power the metasurface hardware controller meanwhile to control a second subgroup of metasurface unit cells for directional reflection of the RF signals after having voltage or current provided to the respective varactor or other tunable phase adjustment circuits in order to adjust a phase change of individual metasurface unit cells and a phase change profile across the surface of the metasurface unit cell array. In this way, the metasurface unit cell array may be self-powering to provide for controlled adjustments to directionality of reflection of the incident RF signals in embodiments herein. In some particular embodiments, this may include controlling directionality of tracking location RF signals generated by execution of machine readable code instructions of an asset tracking system by the metasurface hardware controller and a tracking signal radio or by an operatively coupled information handling system with a wireless adapter. Harvested power may be sent to a wireless interface adapter of the information handling system powered by the batteries of the metasurface unit cell array according to some embodiments herein.

At block 908, the metasurface PMU may determine whether the second battery, or whichever battery, that is providing power to the metasurface hardware controller and other components of the metasurface unit cell array to control directionality and gain of beamforming in reflected RF signals has dropped below a power level. The metasurface PMU may then switch to the first battery, or the other battery, that was charging to provide power to the metasurface hardware controller and other components of the metasurface unit cell array to control directionality and gain of beamforming in reflected RF signals, and transition the second battery, or the battery that is drained, to charge from the harvested power DC voltage from the metasurface unit cell SIWs and the rectifier circuits. In this way, the metasurface PMU may toggle between charging the first battery while the second battery provides power to the metasurface unit cell array and vice-versa. Further, the first or second battery may alternately provide charge to the metasurface controller to execute machine readable code instructions of an asset tracking system and a location data RF signal radio or a wireless adapter at an operatively coupled information handling system to provide power to sent tracking location RF signals for tracking hardware assets in some embodiments herein.

The method 901 may continue to block 910 which includes determining if the metasurface unit cell array is still initiated. Where the metasurface unit cell array is still initiated the method 901 proceeds to block 904 with the metasurface unit cell array continuing to harvest EM energy from incident RF signals at the metasurface unit cell array. Where the metasurface unit cell array is no longer initiated, the method 901 may end here.

The processes or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:

a hardware processor, a memory device, and a power management unit (PMU) to provide power to the hardware processor and memory device;

a metasurface unit cell array operatively coupled to the information handling system to harvest power from incident electromagnetic (EM) waves of a radiofrequency (RF) signal from an RF environment;

the metasurface unit cell array including a plurality of metasurface unit cells, where each metasurface unit cell includes a reflective element resonant structure formed on a dielectric substrate to reflect a first portion of the EM waves of the RF signal incident to the surface of the metasurface unit cell;

each metasurface unit cell including a substrate-integrated waveguide (SIW) embedded in the dielectric substrate including an EM coupling probe to capture the RF signal by EM coupling from a conductive interconnect electrically coupled to the surface of the metasurface unit cell to harvest power from a second portion of the EM waves of a captured RF signal;

a rectifier circuit operatively coupled to the EM coupling probe to convert the second portion of the EM waves of the captured RF signal from the plurality of metasurface unit cells into a direct current (DC) voltage output for the harvested power; and a metasurface PMU to selectively charge a first battery of the metasurface unit cell array with the DC voltage output and discharge a second battery of the metasurface unit cell array to power a metasurface hardware controller to provide power to adjust tunable phase-shifting circuits across the plurality of metasurface unit cells in an phase-shifted interference pattern to directionally beamform a reflected RF signal from the RF signal incident to the surface of the metasurface unit cell array toward a receiving device.

2. The information handling system of claim 1 further comprising:

the metasurface PMU discharging harvested power from the second battery to the metasurface hardware controller executing machine readable code instructions of an asset tracking system to generate a tracking location RF signal to transmit towards the receiving device to track the information handling system.

3. The information handling system of claim 1 further comprising:

a first subgroup of the plurality of metasurface unit cells comprising the SIWs to harvest power from the EM waves of the captured RF signals via the rectifier circuit to charge the first battery; and a second subgroup of the plurality of metasurface unit cells comprising metasurface unit cells to, via the tunable phase-shifting circuits, beamform the reflected RF signal towards the receiving device.

4. The information handling system of claim 1 further comprising:

the rectifier circuit comprising a staged Dickson voltage rectifier that includes sets of diodes and capacitors that each define a stage and wherein the number of stages formed within the staged Dickson voltage rectifier is selected based on expected RF signal power of the captured harvested from the SIWs of the plurality of metasurface unit cells.

5. The information handling system of claim 1 further comprising:

the rectifier circuit comprising wide power range rectifier circuit comprising plural staged Dickson voltage rectifiers that each include sets of diodes and capacitors that each define a stage within the staged Dickson voltage rectifiers, wherein a first staged Dickson voltage rectifier has a first number of stages and a second staged Dickson voltage rectifier has a second number of stages that differs from the first number of stages to accommodate different RF signal power levels of the captured RF signal; and the plural staged Dickson voltage rectifiers of the wide power range rectifier circuit are operatively coupled to an RF circulator switch to dynamically switch by the RF circulator switch between the plural staged Dickson voltage rectifiers depending on detected RF signal power levels meeting an RF signal power threshold level.

6. The information handling system of claim 5 further comprising:

the RF circulator switch is a vanadium dioxide switch that is RF signal power dependent and switched based on a voltage signal from an RF signal power detection probe at the wide power range rectifier circuit.

7. The information handling system of claim 1 further comprising:

an RF power combiner circuit to combine captured RF signals from EM coupling probes in SIWs across a subset plurality of metasurface unit cells into a single output for the rectifier circuit.

8. The information handling system of claim 1 further comprising:

an impedance matching network circuit to optimize power transfer of the captured RF signals from the plurality of metasurface unit cells to the rectifier circuit.

9. A method of tracking a hardware asset comprising:

with a metasurface unit cell array operatively coupled to the hardware asset, harvesting power from electromagnetic (EM) waves of radiofrequency (RF) signals incident with the metasurface unit cell array including a plurality of metasurface unit cells, each of the plurality of metasurface unit cells including a reflective element resonant structure formed on a dielectric substrate to reflect a first portion of electromagnetic EM waves of a radiofrequency (RF) signal incident to the surface of the metasurface unit cell and a substrate-integrated waveguide (SIW) embedded in the dielectric substrate including an EM coupling probe to capture a second portion of the EM waves of the RF signal from an RF environment by EM coupling from a conductive interconnect electrically coupled to the surface of the metasurface unit cell to harvest power from the second portion of the EM waves of a captured RF signal:

converting the second portion of the EM waves of the captured RF signal from the plurality of metasurface unit cells into a direct current (DC) voltage output for the harvested power a rectifier circuit, wherein the rectifier circuit includes a staged voltage rectifier that includes sets of diodes and capacitors that each define a stage; and selectively charging, with a metasurface power management unit (PMU) a first battery of the metasurface unit cell array and discharge a second battery of the metasurface unit cell array to power a metasurface hardware controller executing machine readable code instructions of an asset tracking system to generate tracking location data RF signals for transmission towards a receiving device to track the hardware asset.

10. The method of claim 9 further comprising:

providing power from the second battery to a wireless interface adapter of the hardware asset to transmit the tracking location data RF signals towards the receiving device to track the hardware asset.

11. The method of claim 9 further comprising:

providing power from the second battery to a tunable phase-shifting circuit at the plurality of metasurface unit cells to adjust a phase of the reflected first portion of the EM waves of the RF signal in order to create a phase change profile across the surface of the metasurface unit cell array to beamform the tracking location data RF signals towards the receiving device to track the hardware asset.

12. The method of claim 9, wherein a first subgroup of the plurality of metasurface unit cells comprises the SIWs to harvest power from the EM waves via the rectifier circuit to charge the first battery and a second subgroup of the plurality of metasurface unit cells comprises metasurface unit cells to, via a tunable phase-shifting circuit, beamform the reflected first portion of EM waves of the RF signal towards the receiving device.

13. The method of claim 9 further comprising:

detecting RF signal power levels at the rectifier circuit, wherein the rectifier circuit is a wide power range rectifier circuit comprising plural staged voltage rectifiers that each include sets of diodes and capacitors that each define the stages within the plural staged voltage rectifiers and a first staged voltage rectifier has a first number of stages and a second staged voltage rectifier has a second number of stages that differs from the first number of stages to accommodate different RF signal power levels of the captured RF signal; and dynamically switching between the plural staged voltage rectifiers depending on detected RF signal power levels meeting an RF signal power threshold level with an RF circulator switch operatively coupling the captured RF signal to the plural staged voltage rectifiers of the wide power range rectifier circuit.

14. A metasurface unit cell array comprising:

a metasurface hardware controller, a metasurface power management unit (PMU) to provide power to the metasurface hardware controller, and a plurality of metasurface unit cells wherein each metasurface unit cell includes a reflective element resonant structure formed on a dielectric substrate to reflect a first portion of electromagnetic EM waves of a radiofrequency (RF) signal incident to the surface of the metasurface unit cell;

each metasurface unit cell including a substrate-integrated waveguide (SIW) embedded in the dielectric substrate including an EM coupling probe to capture a second portion of the EM waves of the RF signal from an RF environment by EM coupling from a conductive interconnect electrically coupled to the surface of the metasurface unit cell to harvest power from the second portion of the EM waves of a captured RF signal;

a rectifier circuit, including a staged voltage rectifier that includes sets of diodes and capacitors that each define a stage, operatively coupled to the EM coupling probe to convert the second portion of the EM waves of the captured RF signal from the plurality of metasurface unit cells into a direct current (DC) voltage output for the harvested power; and a metasurface PMU to selectively charge a first battery of the metasurface unit cell array with the DC voltage output and discharge a second battery of the metasurface unit cell array to power a metasurface hardware controller to provide power to adjust tunable phase-shifting circuits across the plurality of metasurface unit cells in a phase-shifted interference pattern to directionally beamform a reflected RF signal from the RF signal incident to the surface of the metasurface unit cell array toward a receiving device.

15. The metasurface unit cell array of claim 14 further comprising:

the metasurface PMU discharging harvested power from the second battery to the metasurface hardware controller executing machine readable code instructions of an asset tracking system to generate a tracking location RF signal to transmit towards the receiving device to track a hardware asset associated with the metasurface unit cell.

16. The metasurface unit cell array of claim 14 further comprising:

a first subgroup of the plurality of metasurface unit cells comprising the SIWs to harvest power from the captured RF signals via the rectifier circuit to charge the first battery; and a second subgroup of the plurality of metasurface unit cells comprising metasurface unit cells to, via the tunable phase-shifting circuits, beamform the reflected RF signal towards the receiving device.

17. The metasurface unit cell array of claim 14 further comprising:

the rectifier circuit comprising wide power range rectifier circuit comprising plural staged voltage rectifiers that each include sets of diodes and capacitors that each define the stages within the staged voltage rectifiers, wherein a first staged voltage rectifier has a first number of stages and a second staged voltage rectifier has a second number of stages that differs from the first number of stages to accommodate different RF signal power levels of the captured RF signal; and the plural staged voltage rectifiers of the wide power range rectifier circuit are operatively coupled to an RF circulator switch to dynamically switch between the plural staged voltage rectifiers depending on detected RF signal power levels meeting an RF signal power threshold level.

18. The metasurface unit cell array of claim 17 further comprising:

the RF circulator switch is a vanadium dioxide switch that is RF signal power dependent and switched based on a voltage signal from an RF signal power detection probe at the wide power range rectifier circuit.

19. The metasurface unit cell array of claim 14 further comprising:

an RF power combiner circuit to combine captured RF signals from EM coupling probes in SIWs across a subset plurality of metasurface unit cells into a single output for the rectifier circuit.

20. The metasurface unit cell array of claim 14 further comprising:

an impedance matching network circuit to optimize power transfer of the captured RF signals from the plurality of metasurface unit cells to the rectifier circuit.

* * * * *